(12) United States Patent
Acosta et al.

(10) Patent No.: US 6,765,640 B1
(45) Date of Patent: Jul. 20, 2004

(54) REFLECTIVE LIQUID CRYSTAL DEVICES

(75) Inventors: Elizabeth Jane Acosta, Oxfordshire (GB); Martin David Tillin, Oxfordshire (GB); Michael John Towler, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/031,654

(22) PCT Filed: May 15, 2000

(86) PCT No.: PCT/JP00/03118

§ 371 (c)(1),
(2), (4) Date: Nov. 13, 2001

(87) PCT Pub. No.: WO00/70394

PCT Pub. Date: Nov. 23, 2000

(30) Foreign Application Priority Data

May 15, 1999  (GB) .............................. 9911246

(51) Int. Cl.[7] .......................... G02F 1/1335; G02F 1/13
(52) U.S. Cl. .......................... 349/119; 349/96; 349/98; 349/113; 349/117; 349/177
(58) Field of Search ............................. 349/96, 119, 98, 349/117, 177, 113

(56) References Cited

U.S. PATENT DOCUMENTS

| | | | | |
|---|---|---|---|---|
| 6,061,042 A | * | 5/2000 | Takahashi et al. | 345/87 |
| 6,104,368 A | * | 8/2000 | Bonnett et al. | 345/94 |
| 6,204,904 B1 | * | 3/2001 | Tillin et al. | 349/119 |
| 6,469,768 B1 | * | 10/2002 | Lee | 349/177 |
| 2003/0128314 A1 | * | 7/2003 | Dozov et al. | 349/113 |

FOREIGN PATENT DOCUMENTS

| | | | |
|---|---|---|---|
| EP | 869470 A | * | 10/1998 |
| GB | 231878 A | * | 5/1998 |

* cited by examiner

*Primary Examiner*—Huyen Ngo
(74) *Attorney, Agent, or Firm*—Renner, Otto, Boisselle, & Sklar, LLP

(57) ABSTRACT

A reflective liquid crystal device comprises in sequence a linear polarizer, a retarder arrangement comprising two retarders, and a reflector. A first of the retarders provides a retardation of $m\lambda/2$ and a second of the retarders provides a retardation of $n\lambda/4$, where m is an integer and n is an odd integer, and wherein at least one of the first and second retarders comprises a Bistable Twisted Nematic (BTN) liquid crystal. This BTN retarder is switchable between a first state in which the retarder provides a retardation of $m\lambda/2$ or $n\lambda/4$ and a second state in which the retardation is zero.

19 Claims, 44 Drawing Sheets

FIG. 3

|    | Twist of LC layer φ (degrees) | Input director of LC θ(φ) (degrees) | Δnd/λ (λ=550nm) | Thickness of LC d (μm) |
|----|---|---|---|---|
| 1  | 0     | -45    | .25  | 2.007 |
| 2  | -11.4 | -37.76 | .252 | 2.023 |
| 3  | -23.4 | -30    | .26  | 2.088 |
| 4  | -36.7 | -21.1  | .275 | 2.208 |
| 5  | -50.6 | -11.1  | .304 | 2.441 |
| 6  | -63.6 | 0      | .354 | 2.842 |
| 7  | -70.1 | 8      | .405 | 3.252 |
| 8  | -72.5 | 15.2   | .467 | 3.75  |
| 9  | -69.9 | 21.78  | .536 | 4.304 |
| 10 | -65.5 | 25.66  | .582 | 4.673 |
| 11 | -58.1 | 29.6   | .63  | 5.058 |
| 12 | -50   | 32.7   | .667 | 5.355 |
| 13 | -38.4 | 36.2   | .704 | 5.653 |
| 14 | -25.1 | 39.5   | .731 | 5.869 |
| 15 | -12.1 | 42.4   | .746 | 5.99  |
| 16 | 0     | 45     | .75  | 6.022 |

REFLECTIVE LIQUID CRYSTAL DEVICES

TECHNICAL FIELD

The present invention relates to reflective liquid crystal devices and more particularly to reflective liquid crystal display device comprising a bistable twisted nematic (BTN) liquid crystal.

BACKGROUND ART

Reflective liquid crystal devices typically comprise a linear polariser and a mirror, with one or more retarders and a switchable liquid crystal element sandwiched between the polariser and the mirror. In a first state of the liquid crystal element, linearly polarised light passing through the polariser is reflected from the mirror and arrives back at the polariser with the same linear polarisation. Hence the reflected light is transmitted by the polariser and the device appears in the bright state. In a second state of the liquid crystal element, linearly polarised light is converted to have a circular polarisation such that upon reflection at the mirror the "handedness" of the circular polarisation is changed (i.e. from right to left or from left to right). Light arriving back at the polariser is arranged to have a polarisation angle 90° shifted from the axis of the polariser (either the transmission or the absorption axis of the polariser may be considered and both give identical results). Hence, the reflected light to not transmitted by the polariser and the device appears in the dark state. Reflective liquid crystal devices are attractive particularly for low power consumption applications.

GB9622733.5 describes a reflective liquld crystal display device comprising a polariser and a mirror between which are disposed several retarders. One of the retarders is a liquid crystal element whose optic axis is switchable so as to switch the device between a reflective state and a non-reflective state.

EP0018180 describes a liquld crystal cell comprising a cholesteric liquid crystal. The liquid crystal is bistable and can exist in either one of its two metastable states until specific stops are taken to cause a transition to the other metastable state. Energy is expended only when a transition occurs.

The article "Bistable Twisted Nematic Mode with One Polariser for Reflective Liquid Crystal Displays", Kim, Yu & Lee, IDRC Asia Display 98, Seoul, Korea, p 763, describes a device having in sequence an input linear polariser, a quarter wave retarder, a BTN element, and a mirror.

The article "Reflective Bistable Twisted Nematic Liquid Crystal Display", Xie & Kwok, Jpn J. Appl. Phys. Vol37, part 1, No. 5a (1998), p 2572, describes a device having an input polariser, a BTN mode and a reflector. The proposed device does not include any additional retarders and states that the contrast ratio measured is about 6:1.

WO98/48320 describes a reflective liquid crystal display device comprising a polariser and a mirror between which are disposed a half wave retarder, a quarter wave retarder, and a liquid crystal element.

Abstract 39.3 (published in the SID 1999 International Symposium, Seminar & Exhibition-Advance program, in advance of a conference to be held in San Jose, Calif. USA, May 16–21, 1999) titled "Reflective Single-Polariser Bistable Nematic LCD with Optimum Twist", Y. J. Kim & J. S. Patel, describes a single-polariser reflective LCD having a bistable twisted nematic mode. The twist angles of the two bistable states are 63.6° and 423.6°.

The article "Fast bistable nematic display using monostable surface switching", I. Dozov, M. Nobili and G. Durand, Appl. Phys. Lett. 70 (9), 3 Mar. 1997, describes a device having a two bistable states, namely a metastable uniform (untwisted) state and a half-turn (180°) twist state.

DISCLOSURE OF THE INVENTION

According to a first aspect of the present invention there is provided a reflective liquid crystal device comprising in sequence a linear polariser, a retarder arrangement comprising two retarders, and a reflector, wherein, in at least one state of the device, a first of said retarders acts to rotate linearly polarised light of wavelength $\lambda$, and a second of the retarders acts to convert linealy polarised light of wavelength $y\lambda$ (where $0.7<y<1.3$) to substantially circular polarised light, and wherein at least one of the said first and second retarders comprises a Bistable Twisted Nematic (BTN) liquid crystal.

The wavelength $\lambda$ is an operating wavelength of the reflective liquid crystal device and lies in the visible spectrum and is preferably in the range 400–700 nm, more preferably 420–600 nm, and more preferably still in the region 440–550 nm. Most preferably $\lambda$ is approximately 550 nm.

Preferably, the retarder comprises a BTN liquid crystal providing a retardation of $n\lambda/4$.

According to a second aspect of the present invention there is provided a reflective liquid crystal device comprising in sequence a linear polariser, a retarder arrangement comprising two retarders, and a reflector, wherein a first of said retarders provides a retardation of substantially $m\lambda/2$ and a second of the retarders provides a retardation of substantially $n\lambda/4$ where m is an integer and n is an odd integer, and wherein at least one of the said first and second retarders comprises a Bistable Twisted Nematic (BTN) liquid crystal and is switchable between a first state in which the retarder provides a retardation of substantially $m\lambda/2$ or $n\lambda/4$ and a second state in which the retardation is substantially zero.

According to a third aspect of the present invention there is provided a reflective liquld crystal device comprising in sequence a linear polariser, a retarder arrangement comprising at least three retarders, and a reflector, wherein at least one of said retarders comprises a Bistable Twisted Nematic (BTN) liquid crystal and is switchable between first and second retardation states.

The wavelength $\lambda$ is an operating wavelength of the reflective liquid crystal device and lies in the visible spectrum and is preferably in the range 400–700 nm, more preferably 420–600 nm, and more preferably still in the region 440–550 nm. Most preferably $\lambda$ is approximately 550 nm.

Preferably, the retarder comprising a BTN liquid crystal providing a retardation in said first state of substantially $m\lambda/2$ or $n\lambda/4$ where m is an integer and n is an odd integer, and a retardation in said second state of substantially zero. The others of said retarders may provide a retardation of substantially $m\lambda/2$ or $n\lambda/4$.

"Optic axis" means slow optic axis.

BRIEF DESCRIPTION OF THE DRAWINGS

For a better understanding of the present invention and in order to show how the same may be carried into effect reference will now be made, by way of example, to the accompanying drawings, in which:

FIG. 3 shows LC configurations for which LC behaves equivalently to an untwisted ¼ wave plate retarder ($\theta(\phi)$= angle of the input director of LC with respect to the incident linear polarisation direction, $\phi$=twist of LC layer, $\Delta n.d/\lambda$ specifies the required $\Delta n.d/\lambda$ for which the LC device behaves like a ¼ wave plate retarder);

FIG. 20($b$) shows a two-retarder configuration in reflection described in Embodiment 4(b);

FIG. 20($c$) shows a two-retarder configuration in reflection described in Embodiment 4(c);

BEST MODE FOR CARRYING OUT THE INVENTION

Figure 1:
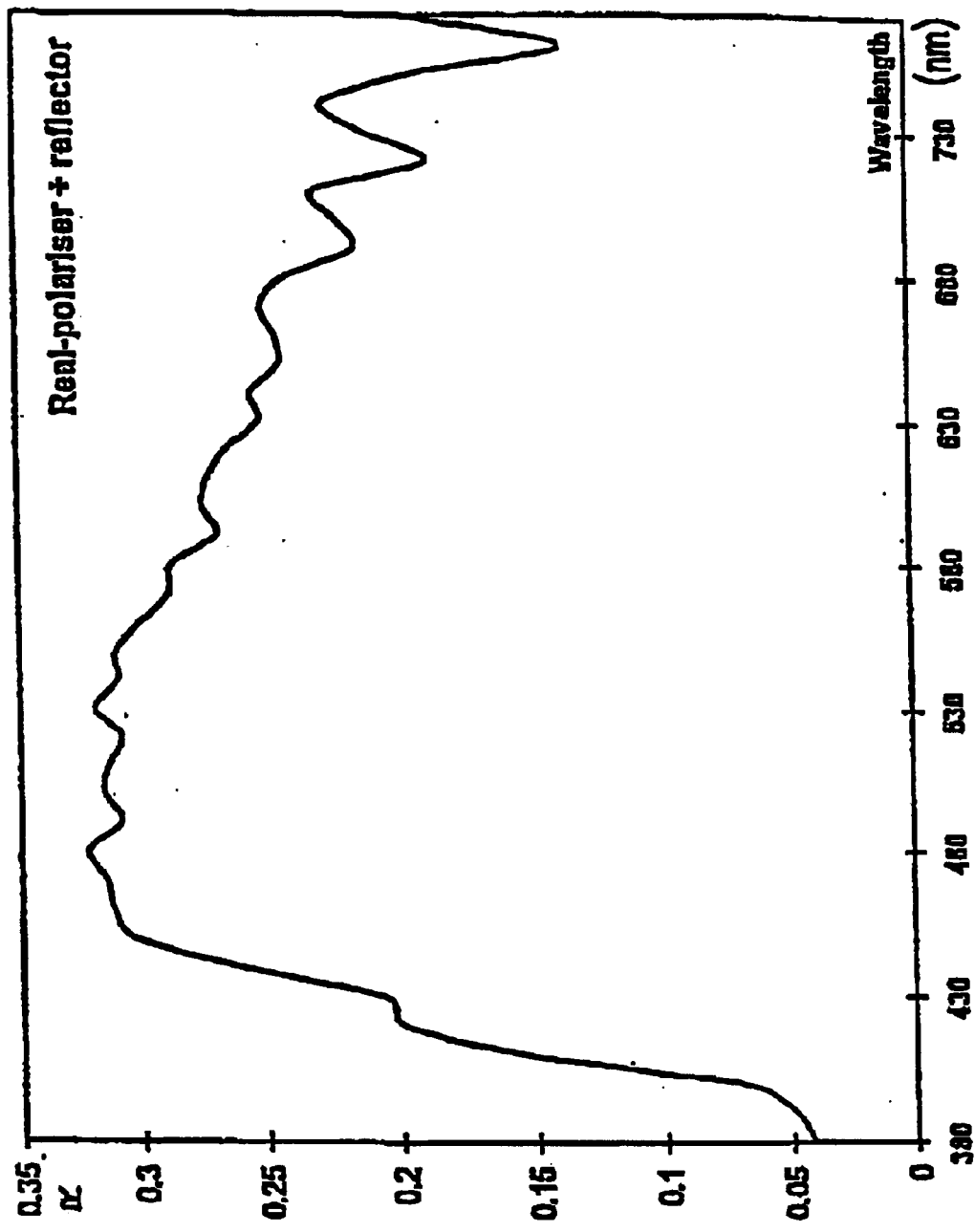
FIG. 1 is a reflectance versus wavelength plot–maximum luminance attainable by the system.

A Bistable Twisted Nematic (BTN) mode used in a reflection configuration requires one of its two metastable states, i.e. addressable states ($\phi$& $\phi$±360°), to provide a dark state and the other a bright state. A single retarder layer (i.e. BTN only) does not provide a good achromatic dark state when used with one polariser in reflection (demonstrated below). Configurations involving several retarder layers are retired when seeking good achromatic dark states that switch to good bright states.

The likelihood of the undesired stable state $\phi\pm180°$ nucleating into an addressed pixel means that its optical appearance (luminance, colour co-ordinates, etc.) may be of importance. It has been found that the stable state $\phi\pm180°$ bears a closer resemblance optically to the high twist metastable state than to the low twist (or untwisted) metastable state, i.e. the reflection spectra of the ($\phi\pm360°$) state is very similar to that of the ($\phi\pm180°$) state.

The Embodiments to be described below provide the option of selecting which of the BTN metastable twist states will provide the dark state and which the bright states, for example in Embodiments 4 & 6 the low twist state gives the dark state and in Embodiment 11 the high twist state gives the dark state. It may be advantageous to select the high twist state to provide the "background" state for the display. By "background" state we refer to the state (dark or bright) that covers a greater percentage of the display over both space and time. For example, in an electronic book, black text would appear on a white background to mimic printed paper, and as a result a large percentage of the display, say approximately 70%, would show white. So, for an electronic book the high twist state would be selected to provide the white state, i.e. the "background" state, so that if any of the undesired twist states ($\phi\pm180°$) did nucleate or remained in the inter-pixel (electrode) gaps (which may be the case if the gaps are very large and the LC is not switched within them) it would be less noticeable to the observer, with less of a detrimental effect on the contrast, than had the low twist $\phi$ state been selected to provide the "background" state.

Alternatively, a black mask can be used to mask-off the inter-pixel (electrode) gaps in the case where the LC within these gaps is not switched out of the undesired ($\phi\pm180°$) twist state by the application of a field during addressing.

Due to the similarity of the reflection spectra for the ($\phi\pm360°$) and the ($\phi\pm180°$) twist states (see Embodiment 9 below), those skilled in the art can apply this invention to the bistable device described by I. Dozov, M. Nobili and G. Durand, Appl. Phys. Lett. 70 (9). 3 Mar. 1997.

In addition to the bright, high contrast requirements for reflection displays, the thickness of the LC layer has to be compatible with fabrication processes. A low birefringence ($\Delta n$) LC material provides a thicker LC layer, though it is also possible to increase the LC layer thickness by introducing a small amount of twist into the layer to compensate for the extra thickness (this may modify the resulting optics). Alternatively, if the fabrication requires a thinner LC layer, a higher birefringence ($\Delta n$) LC material can be used.

Various BTN mode configurations were investigated by numerical modelling for their use in reflection displays. Being a reflective display the luminous reflectance of the bright state will depend on the light source utilised. In the examples given below, a CIE standard illuminant D-65 was used. Dispersion was included in all the modelled elements: 2 $\mu$m thick aluminium reflector; 2.5 $\mu$m polariser; 50 $\mu$m retarders and LC layer. The low birefringence ($\Delta n$~0.065 at 20° C.) liquid crystal MJ96538 (Merck Japan) was used in zero surface tilt configurations, with uniform twist profiles at zero applied field. (nb. Introducing a surface tilt may modify some of these results slightly).

Figure 2:
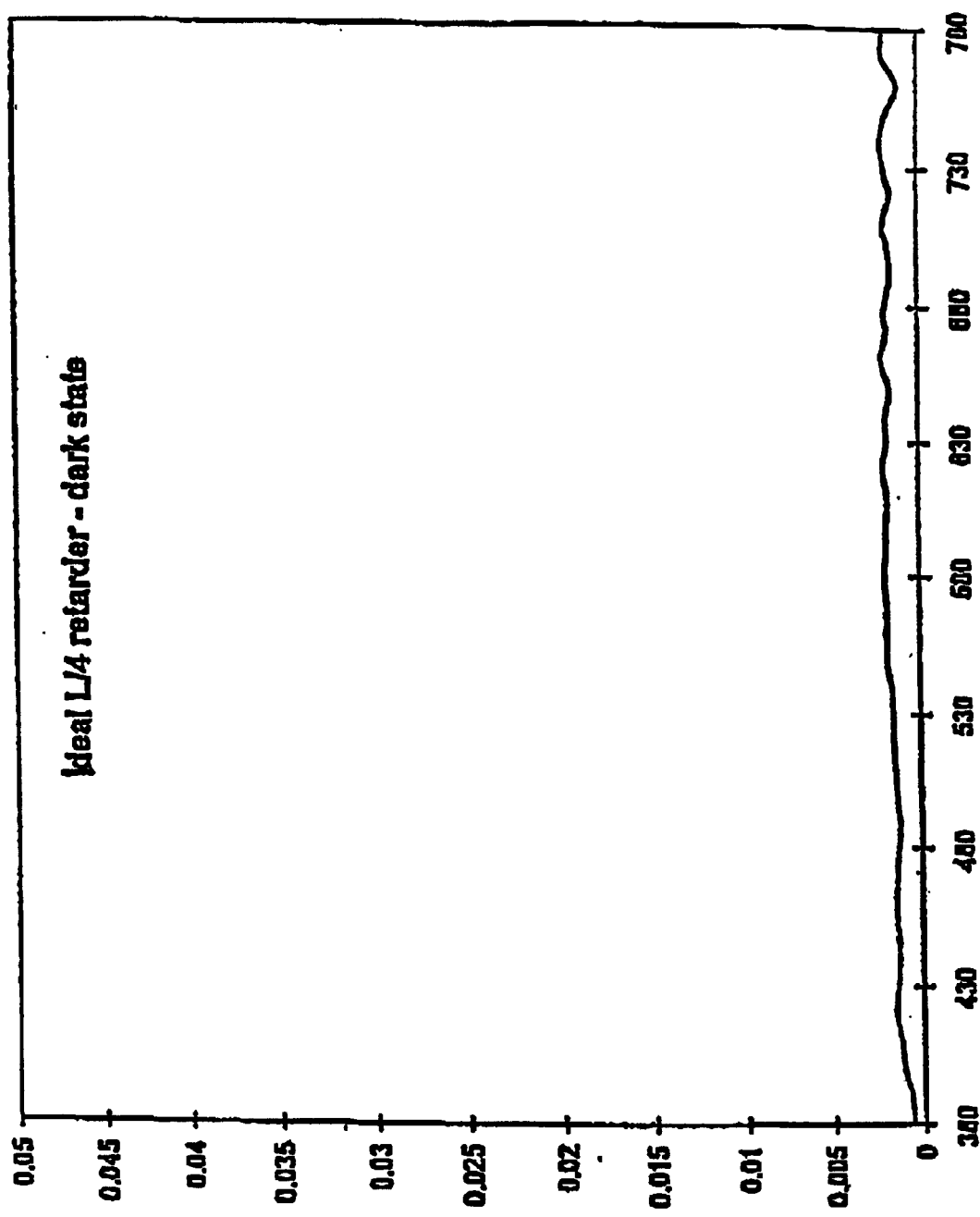
FIG. 2 is a reflectance versus wavelength plot–minimum luminance attainable by the system.

The maximum contrast ratio (CR=$L_{MAX}/L_{MIN}$) attainable for a single polariser reflective system for the above-mentioned elements was calculated to be 169. The maximum luminance ($L_{MAX}$) results from the polariser-reflector configuration (no LC or retarders), and the minimum luminance ($L_{MIN}$) is obtained by adding a perfect (theoretical) quarter-wave retarder, i.e. quarter wave retarder at all wavelengths between the polariser and reflector, oriented at 45° to either the transmission or the absorption axis of the polariser. The luminous reflectance curves for this maximum (bright state) and minimum (dark state) luminances are shown in FIGS. 1 and 2. The dark state is very achromatic in behaviour while the bright state is governed both by the "shape" of the D65 light source and the polariser transmission spectrum.

The embodiments of the invention to be described aim to obtain high contrast in reflection in various BTN configurations by means of achromatic dark states (dark over a wide range of wavelengths, preferably covering all the visible range) which switch to good bright states. Achromaticity of the dark and bright states is desired so that the display does not appear coloured.

The configurations constituting a single polariser reflective device consisting of a single (BTN) retarder and the configurations described in the prior art were modelled for comparative purposes. This was done using the elements an described previously, though suitably adjusted to match those described in the prior art.

Figure 4:
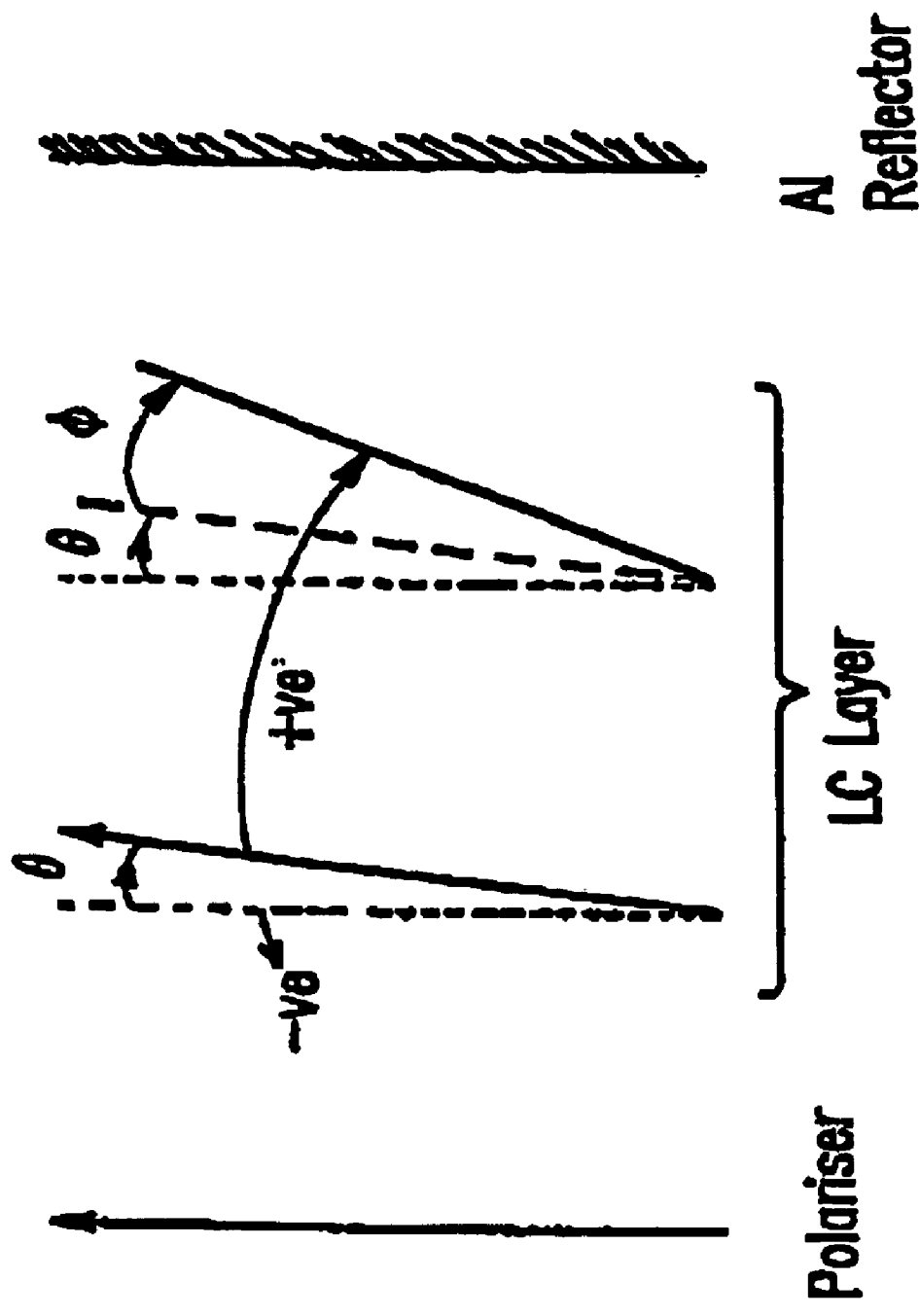
FIG. 4 is a schematic representation of single polariser reflective configuration with a single retarder (BTN), LC configurations from table in FIG. 3.
Figure 5:
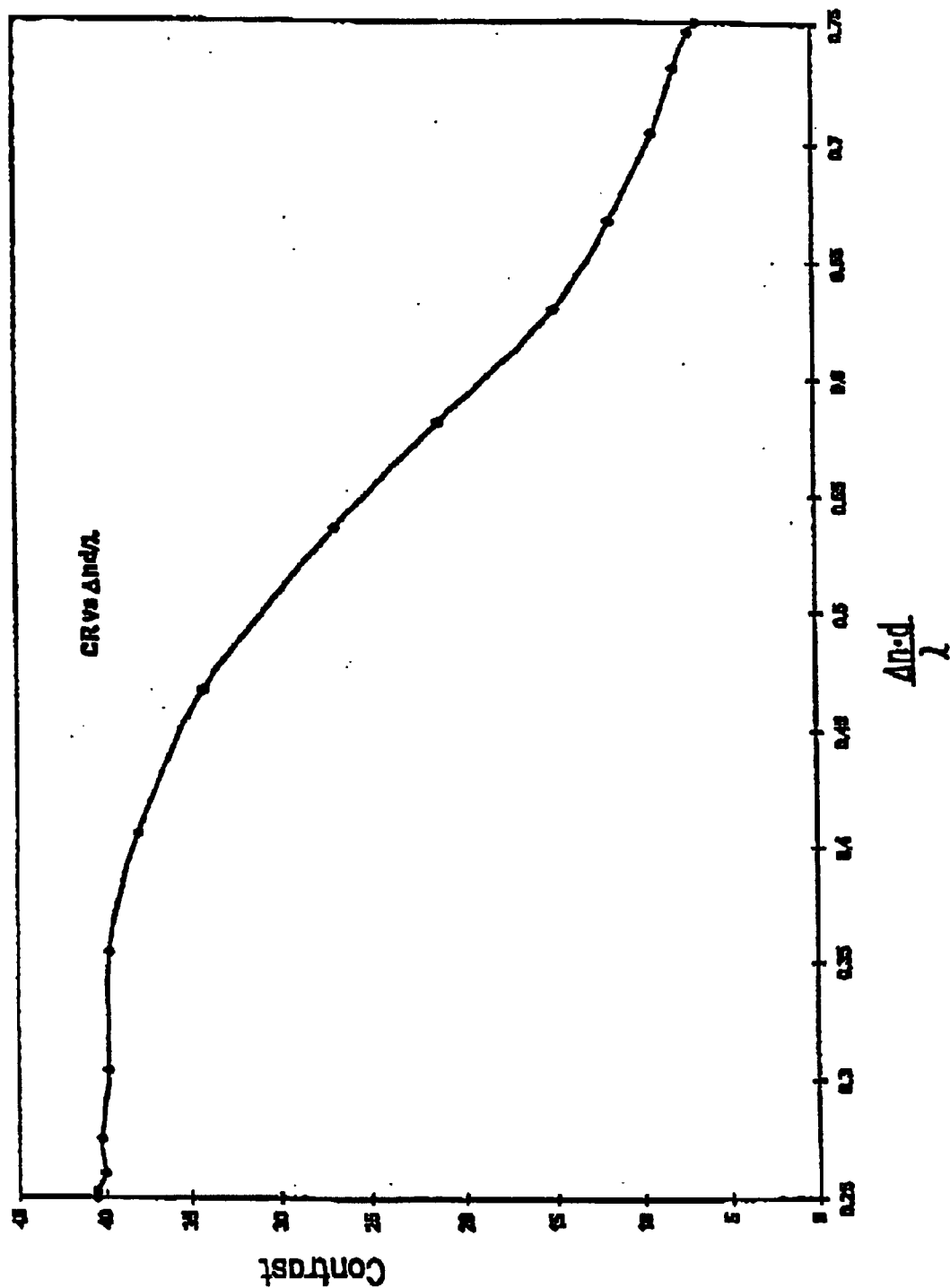
FIG. 5 shows contrasts calculated as a function of $\Delta n.d/\lambda$ for the configurations described in FIG. 4 and FIG. 3 where the high twist state satisfies ($\phi$+360°)
Figure 6:
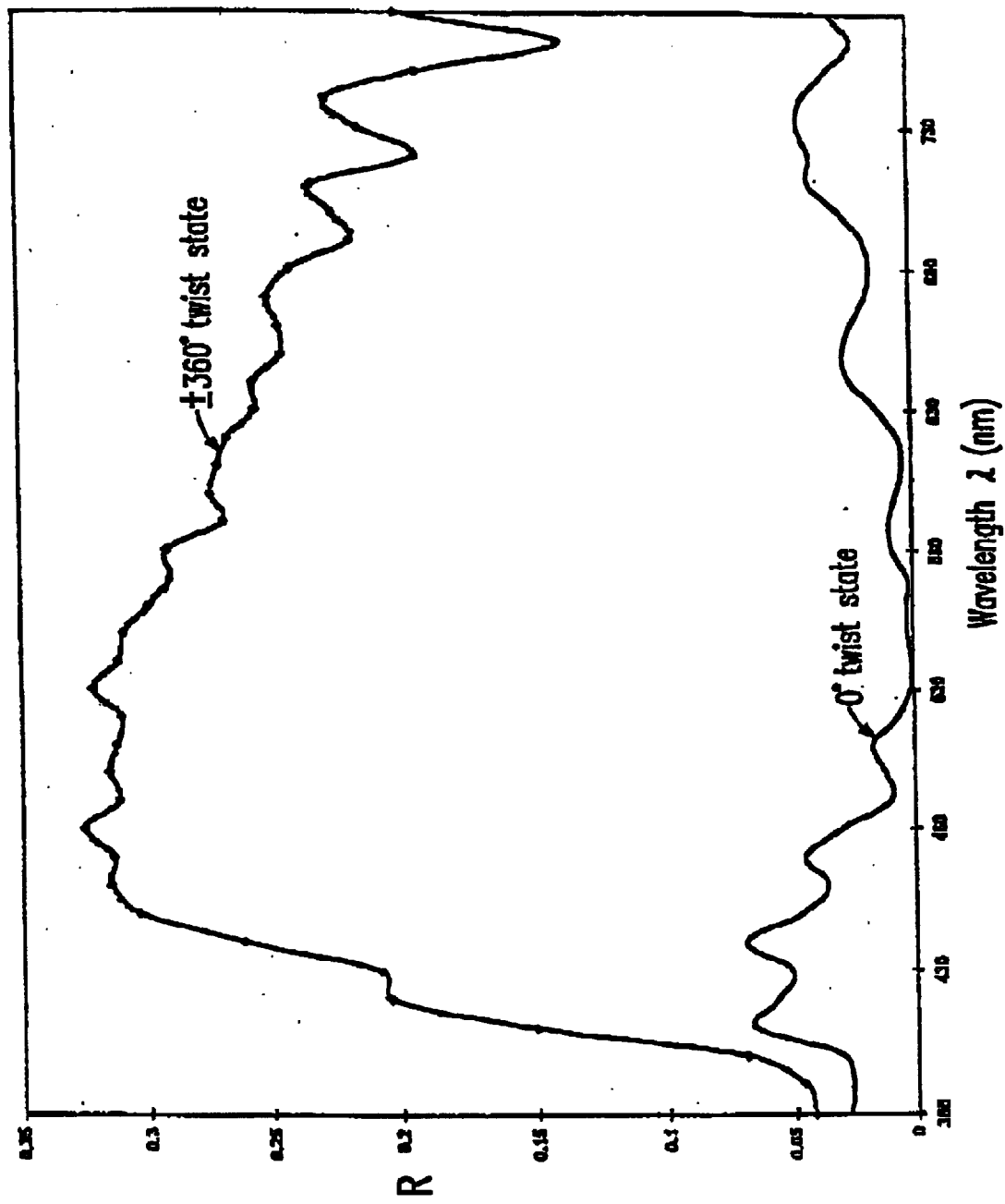
FIG. 6 shows a luminous reflectance versus wavelength plot for the configuration providing the highest contrast described by configuration in FIG. 4, low twist dark state.

The single polariser reflective configurations consisting of single BTN retarder positioned between the reflector and the polariser require that the LC layer behave equivalently to an untwisted ¼ wave plate where the low twist provides the dark state. The LC configurations, i.e. the retardation $\Delta n.d/\lambda$ ($\Delta n$=birefringence, d=thickness, $\lambda$=wavelength), twist $\phi$ and angle $\theta(\phi)$ of the input director of LC with respect to the incident linear polarisation direction) that satisfy this requirement are listed in the table in FIG. 3, covering a thickness range from 2 $\mu$m to 6 $\mu$m ($\Delta n.d/\lambda$ from 0.25 to 0.75 for LC MJ96538). The schematic representation of these configurations are provided in FIG. 4; the BTN mode placed between the polariser and reflector at an orientation ($\theta(\phi)$) to the transmission axis of the polariser. A dark state is obtained when the LC layer corresponds to a ¼-wave or ¼-wave retarder placed at 45° to the transmission axis of the polariser. The bright state corresponds to the high twist state ($\phi\pm360°$). The contrast was calculated for each of the cases listed in table 3 where the high twist state corresponded to the ($\phi+360°$) and plotted as a function of $\Delta n.d/\lambda$, in FIG. 5. Utilising the ($\phi-360°$) state for the bright state instead of the ($\phi+360°$) only changed the resulting contrast by a maximum of 1%, while for some cases it gave an identical contrast. The contrast does not decrease drastically until $\Delta n.d/\lambda>0.4$ (d>3.2 $\mu$m). The highest contrast (CR=40) obtained was for a cell thickness of 2 $\mu$m, untwisted LC layer, $\theta(\phi)=\pm45°$; though at a thickness of 2.8 $\mu$m, $\phi=-63.6°$ and $\theta(\phi)=0°$ the contrast has only decreased to 39. FIG. 6 shows the luminous reflectance as a function of wavelength for the dark and bright states of the highest contrast configuration (d=2 $\mu$m, $\phi=0°$, $\theta(\phi)=\pm45°$). The dark states of all the configurations described in the table in FIG. 3 are chromatic and become more so as the thickness of the LC layer increases (wavelength range over which there is a minimum reflectance reduces from 40 nm to 25 nm).

Figure 7:
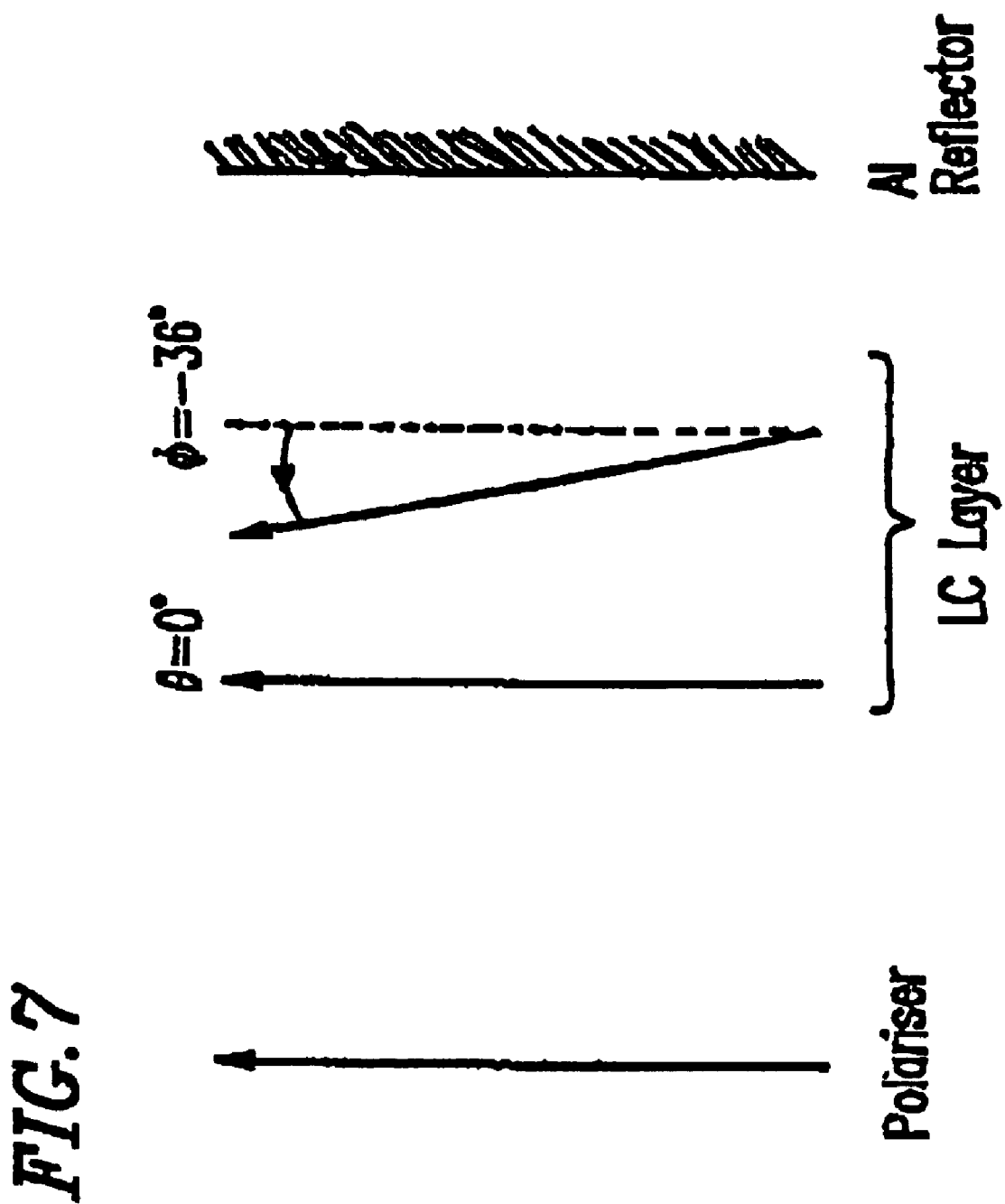
FIG. 7 shows a single retarder (BTN) in single polariser reflective configuration described in prior art by Xie & Kwok in Jpn. J. Appl. Phys, Vol37, part 1, No. 5a (1998), p 2572.
Figure 8:
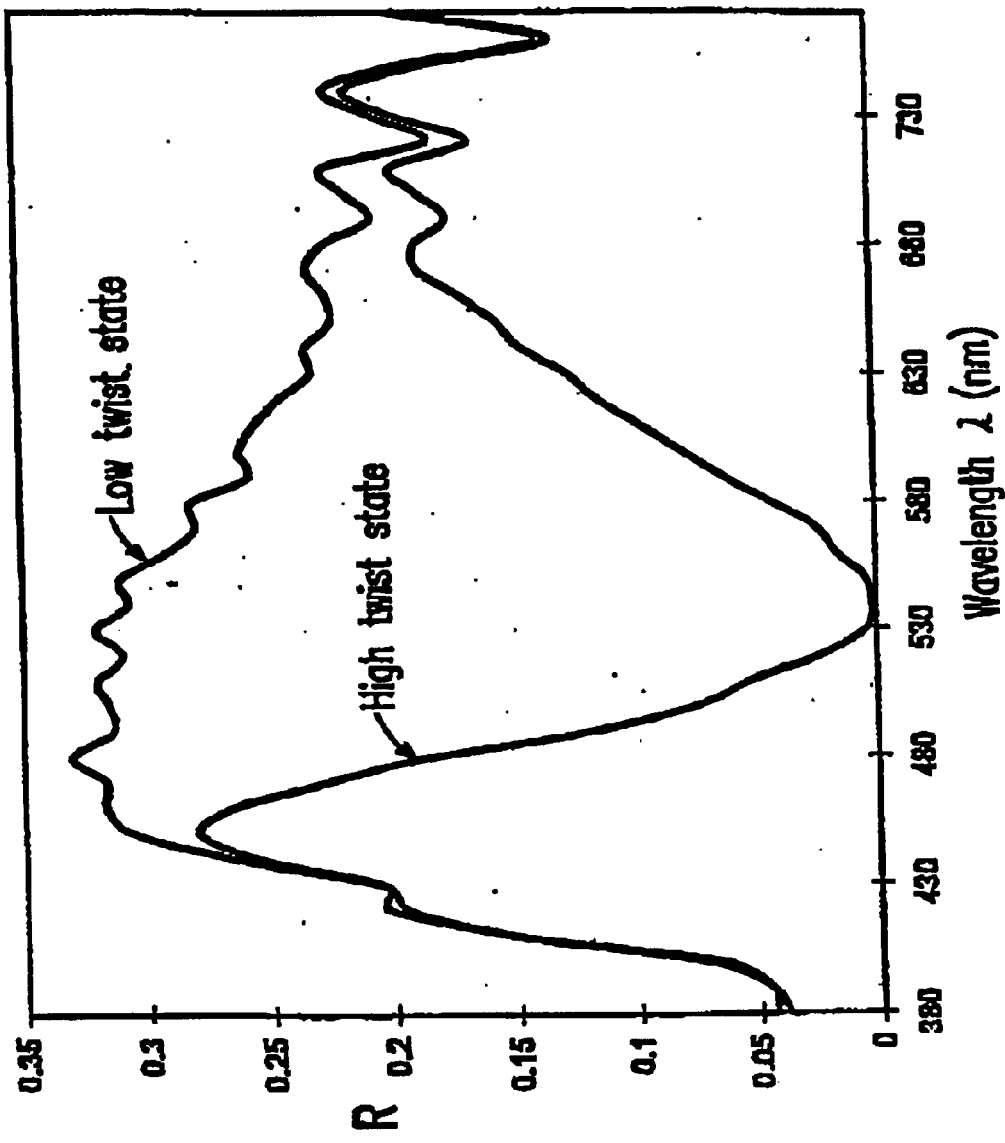
FIG. 8 shows a luminous reflectance versus wavelength plot for the configuration shown in FIG. 7, high twist dark state.
Figure 9:
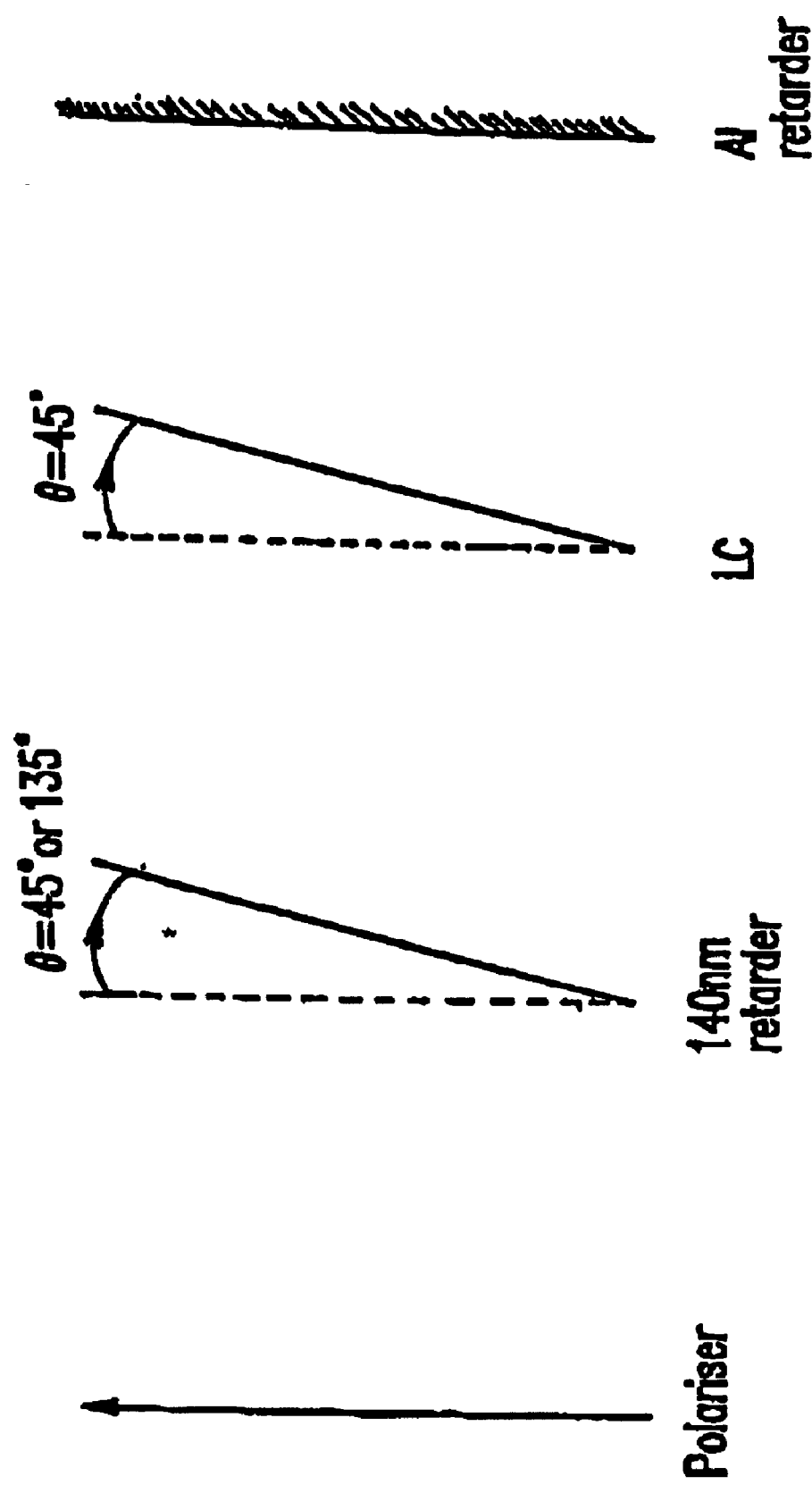
FIG. 9 shows a two-retarder configuration described in prior art by Kim, Yu & Lee at IDRC Asia Display 98.
Figure 10:
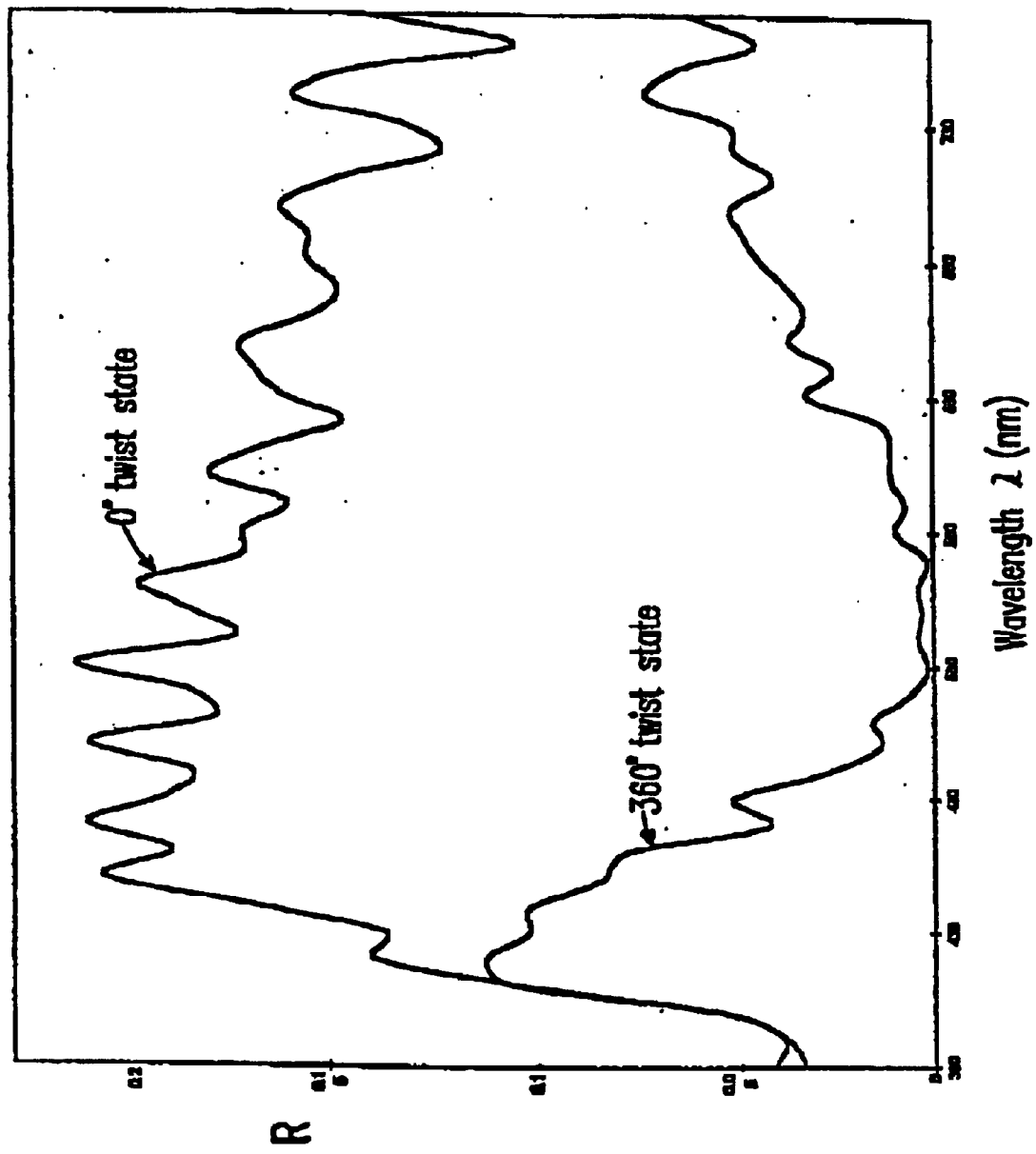
FIG. 10 shows a luminous reflectance versus wavelength plot for the configuration shown in FIG. 9, high twist dark state.

The configuration described by Xie & Kwok in Jpn. J. Appl. Phys, Vol37, part 1, No. 5a (1998), p 2572, is represented schematically in FIG. 7. The high twist state provides the dark state; LC layer thickness 13.7 $\mu$m, $\phi=-36°$ oriented parallel to the transmission axis of the polariser. The resulting luminous reflectance curves, shown in FIG. 8, gave a very chromatic dark state leading to a contrast ratio of ~6. IDRC Asia Display 98 by Kim, Yu & Lee is represented in FIG. 9: 2.9 $\mu$m LC layer thickness, $\phi=0°$ oriented at 45° to the transmission axis of the polariser. A 140 nm retarder positioned between the polariser and BTN was either at 45° or 135° to the transmission axis of the polariser and depending on the retarder's orientation the resulting contrast was either ~13 or ~17. The resulting luminous reflectance curves are shown in FIG. 10.

As can be seen, both the prior art and the single polariser reflective configurations with a single retarder (BTN) give low contrasts with chromatic dark states, compared to the maximum attainable contrast of 169.

The following configurations described in the embodiments are mostly examples of the LC layer acting an a switchable retarder located adjacent to the reflector. This set up aids fabrication purposes; i.e. no internal retarders are required in the device as they can be located externally. Two and three retarder configurations are investigated. In most of the embodiments discussed, any of the other retarder elements described in the configurations can be substituted by a LC layer so long as it adopts the correct retardation and orientation.

The configurations investigated obtain the dark state by converting linearly polarised light generated by the polariser into circularly polarised light. One of the BTN metastable states contributes to the conversion to circularly polarised light while the other metastable state doesn't. Upon reflection back through the system, a dark and a bright state are obtained. Alternatively, it is possible to convert the linearly polarised light generated by the polariser into elliptically polarised light by altering the retarder properties, e.g. orientation and/or thickness, such that one of the BTN metastable twist states converts the elliptically polarised light to circular polarised light and the other metastable twist state converts elliptically polarised light to linear polarised light. Upon reflection back through the system a dark and a bright state are obtained.

Figure 30:
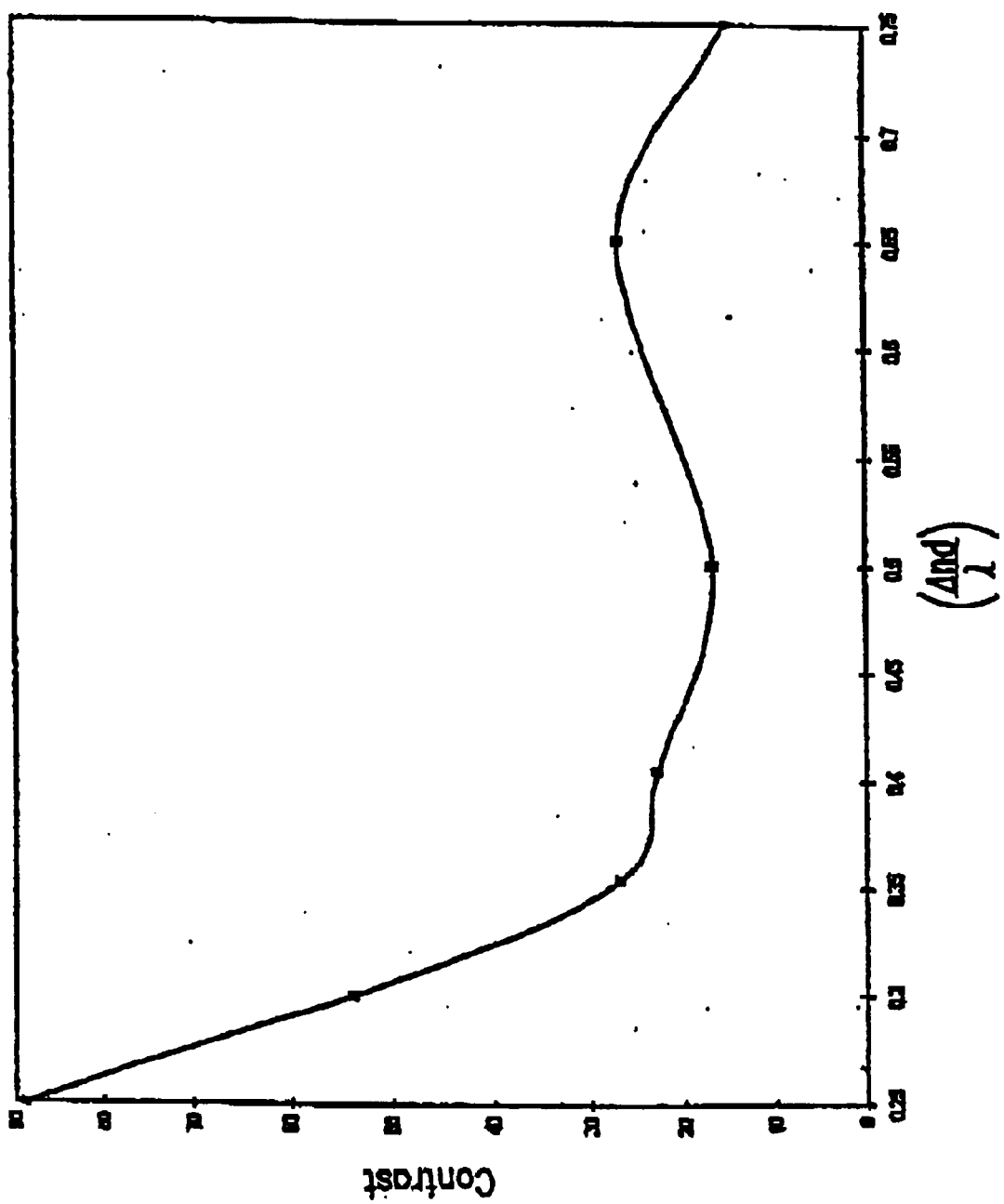
FIG. 30 shows a contrast plot as a function of $\Delta n.d/\lambda$, for each d the optimum $\theta$ and $\phi$ are found.
Figure 41:
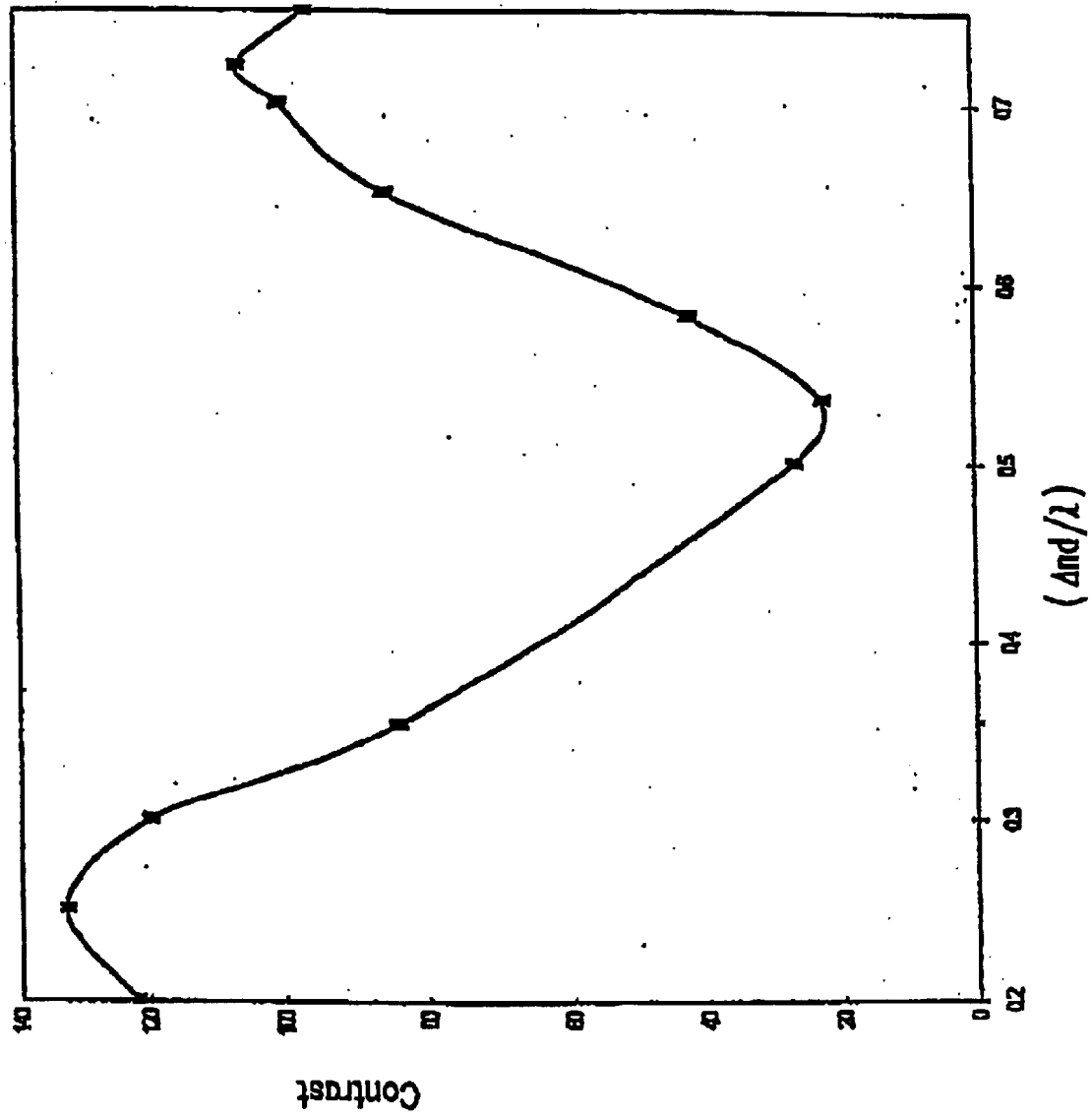
FIG. 41 is a contrast plot shown as a function of $\Delta n.d/\lambda$, for each d the optimum $\theta$ and $\phi$ are found.

Those skilled in the art will be able to vary the actual values from those in the embodiments and obtain acceptable performance. The tolerance x to these changes is of course configuration dependent, e.g. as seen in FIGS. 30 and 41. In all of the embodiments described below, either the transmission or the absorption axis of the polariser may be considered and give identical results.

It is noted that for each embodiment to be described, an equivalent can be obtained by changing the sign of each angle (i.e. by multiplying all the orientation angles of the retarders and LC as well as the LC twist by −1).

Embodiment 1
Half-wave (λ/2) Retarder+Quarter-wave (λ/4) LC–Untwisted Dark State (φ=0°)

Figure 11:
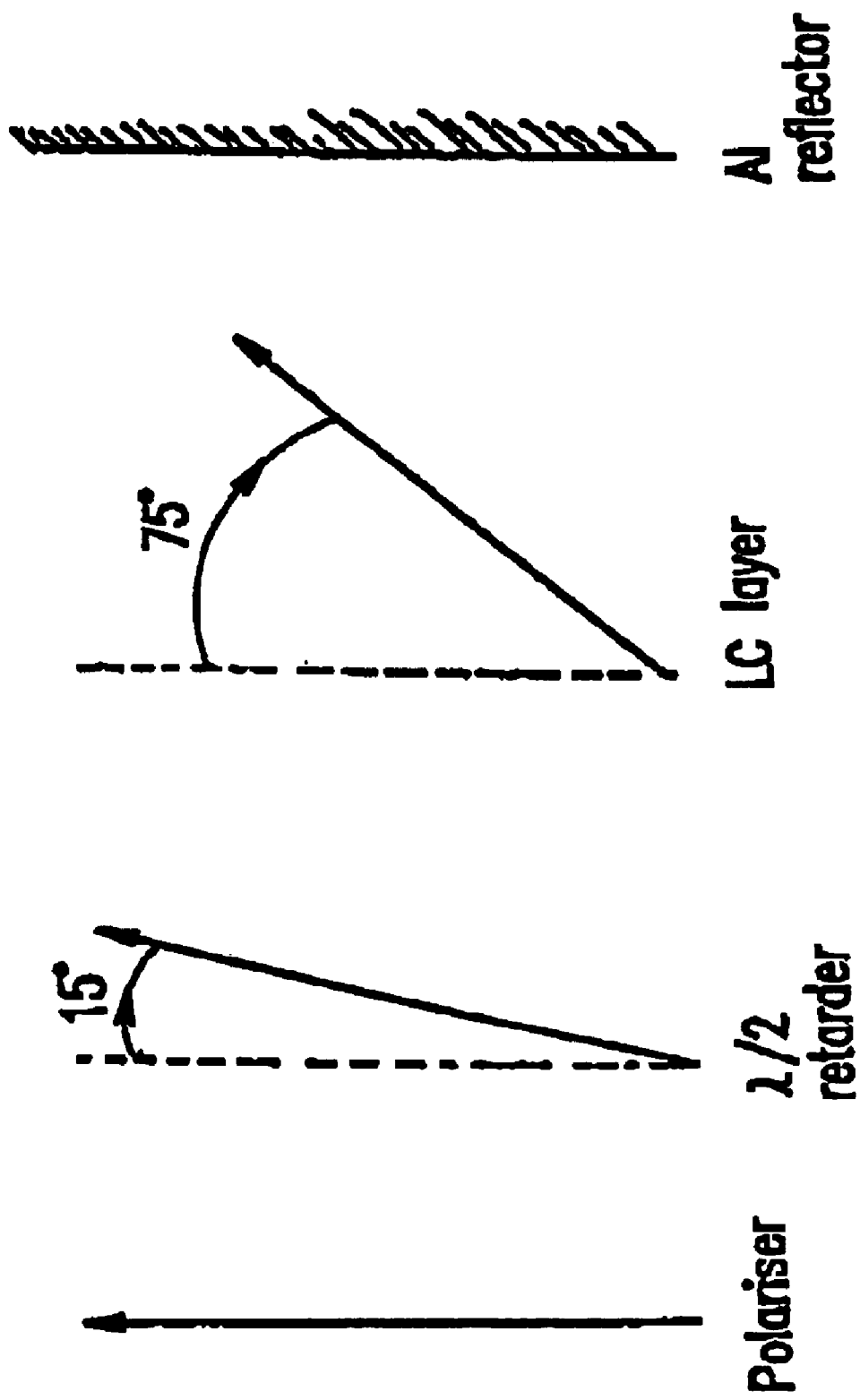
FIG. 11 shows a two-retarder configuration in reflection described in Embodiment 1(a)
Figure 12:
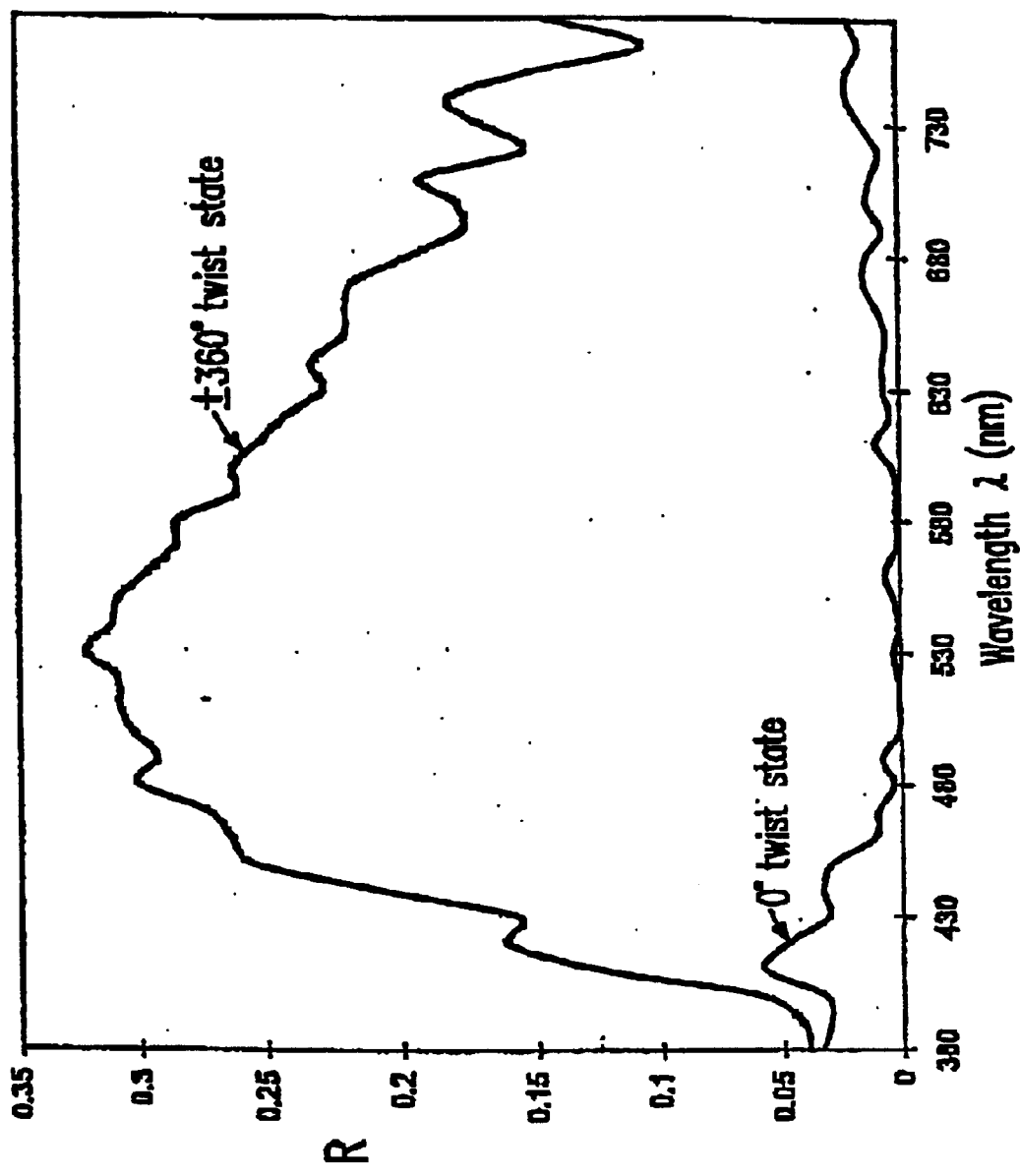
FIG. 12 shows a luminous reflectance versus wavelength plot for the configuration shown in FIG. 11, untwisted dark state.

(a) Configuration shown in FIG. 11: fixed half-wave (Δn.d=270) retarder at 15° to the transmission axis of the polariser followed by a quarter-wave (λ/4) LC layer at 75° to the transmission axis of the polariser. The LC layer is 2 μm thick. A dark state which is more achromatic than that of a single retarder layer is provided by the untwisted state, with a minimum reflectance over ~110 nm wavelength range compared to the 40 nm wavelength range obtained for the best single BTN layer in single polariser reflective configuration. The luminous reflectance plot is shown in FIG. 12. The bright state is the same for both the +360° and −360° twisted state giving a contrast of 79.5.

In this case the fixed half-wave retarder rotates linearly polarised light of wavelength λ=540 nm whilst the quarter-wave LC layer converts light of wavelength y×λ (with y=1) to circular polarised light. Less ideal, but reasonable, results can be obtained with y slightly different from 1. Maintaining λ=540 nm a contrast ratio of 29 is obtained for y=0.9 whilst a contrast ratio of 31 is obtained for y=1.1. It will be appreciated by those skilled in the art that the value of y can be optimised depending upon the embodiment and materials used.

Figure 13:
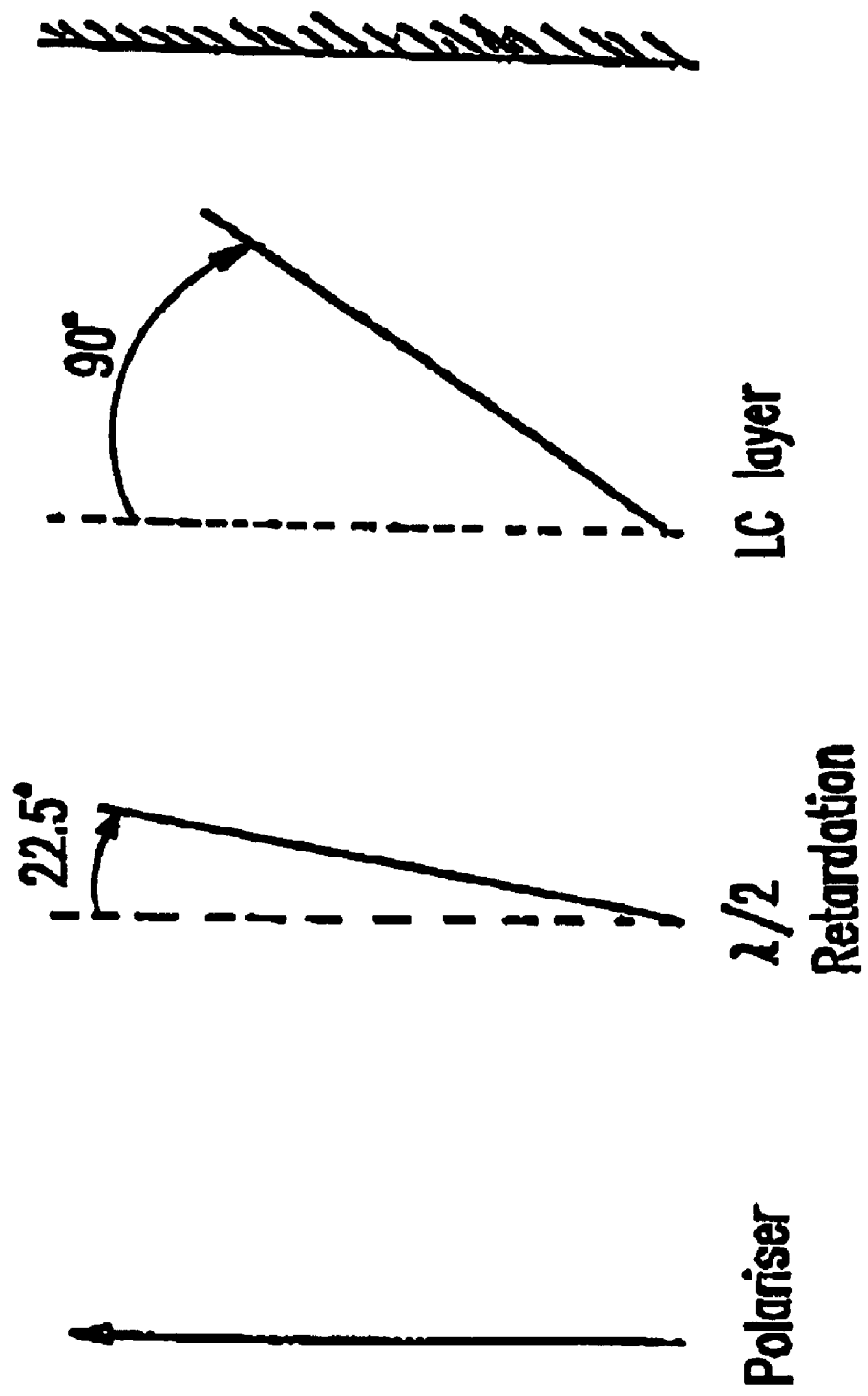
FIG. 13 shows a two-retarder configuration in reflection described in Embodiment 1(b)
Figure 14:
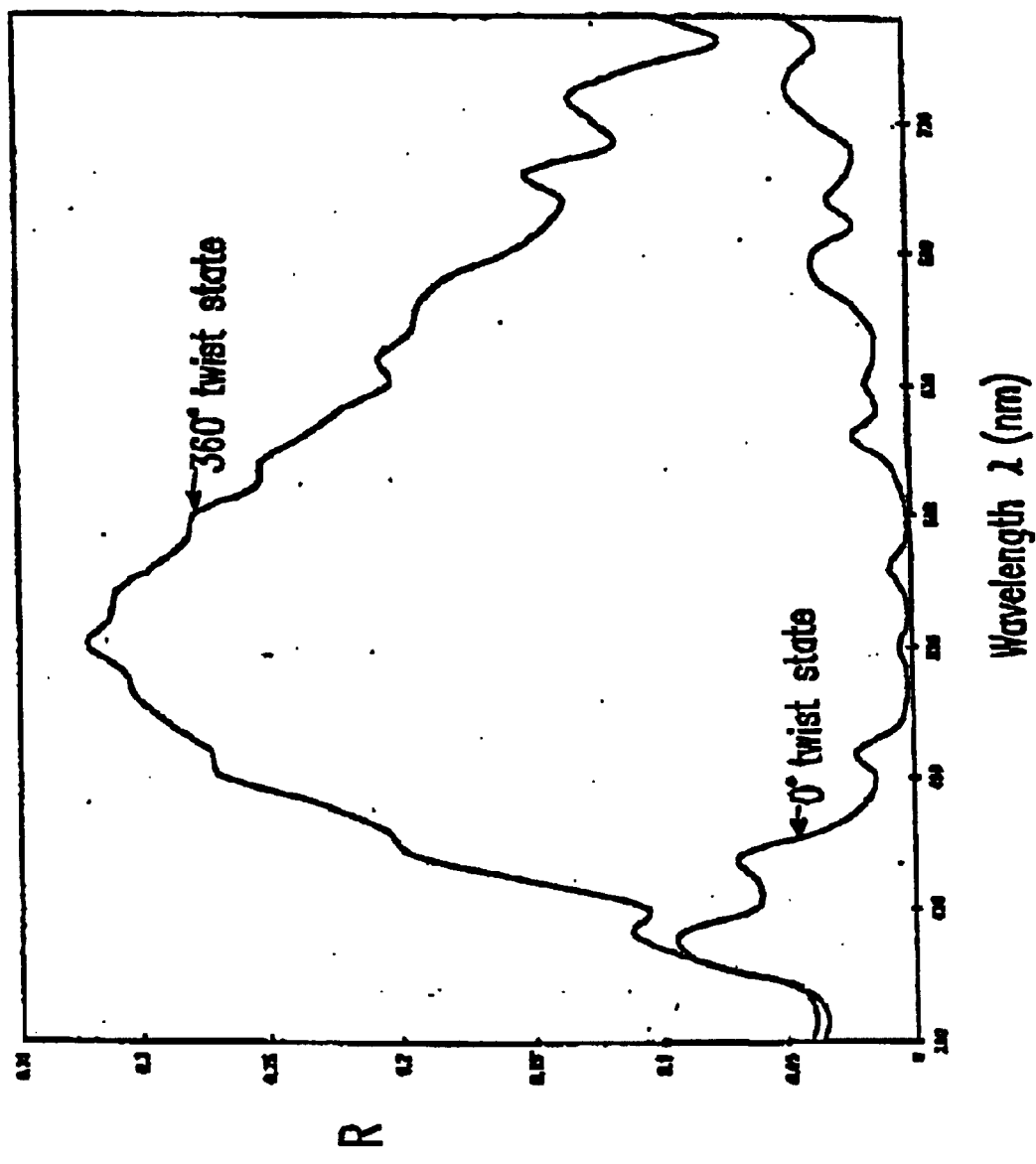
FIG. 14 shows a luminous reflectance versus wavelength plot for the configuration shown in FIG. 13, untwisted dark state.

(b) The half-wave retarder is placed at 22.5° to the transmission axis of the polariser and the LC layer at 90° to the transmission axis of the polariser, see FIG. 13. The LC layer has a thickness of 2 μm. The dark state is given by the untwisted state but both states are shown in FIG. 14 to be quite chromatic. A contrast of 38 is obtained for such a configuration.

Embodiment 2
Half-wave (λ/2) Retarder+Quarter-wave (λ/4) LC–Low Twist φ Provides Dark State In this case, both BTN states have some degree of twist as a result of using a thicker LC layer (d=2.8 μm).

Figure 15:
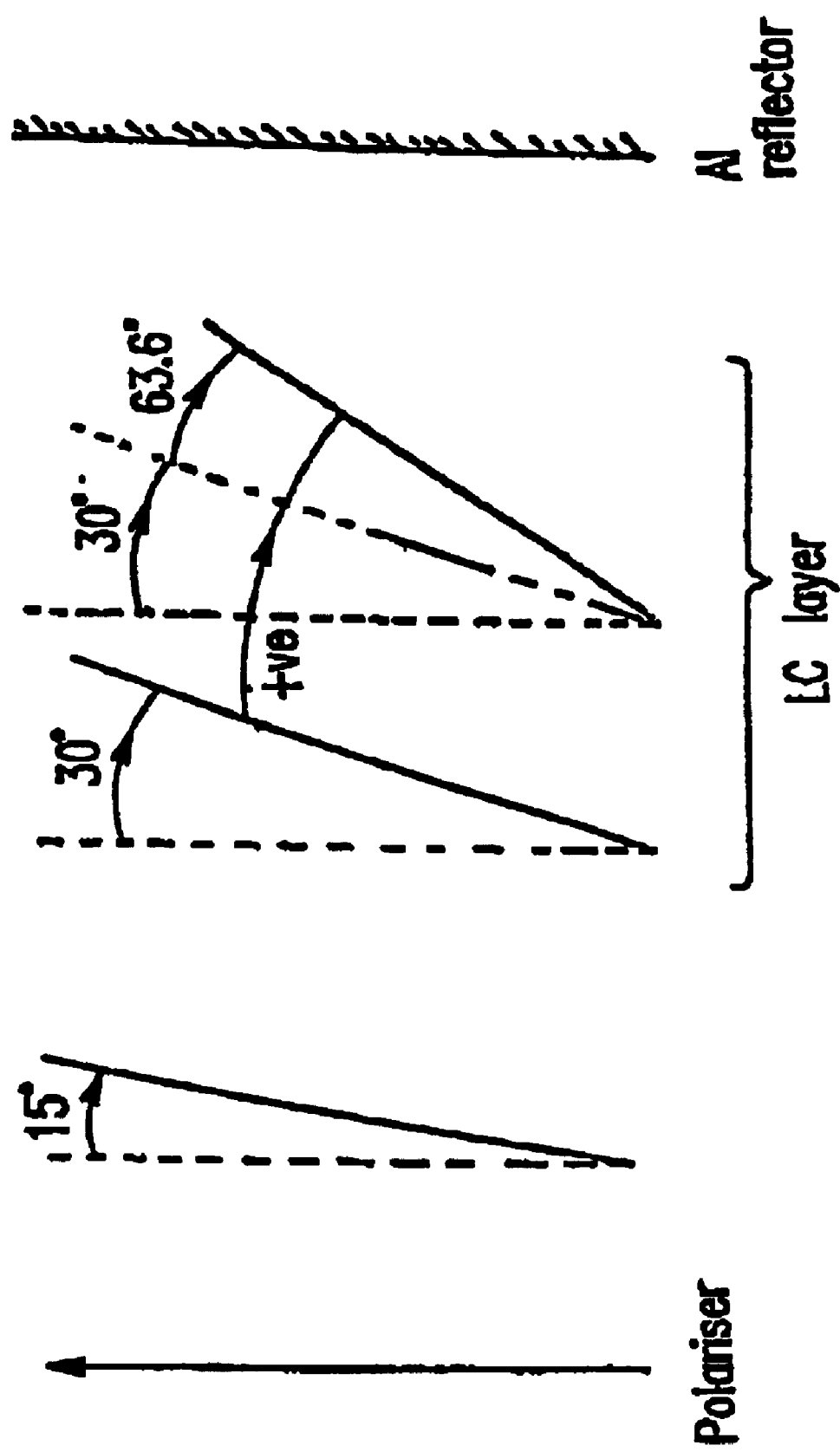
FIG. 15 shows a two-retarder configuration in reflection described in Embodiment 2.
Figure 16:
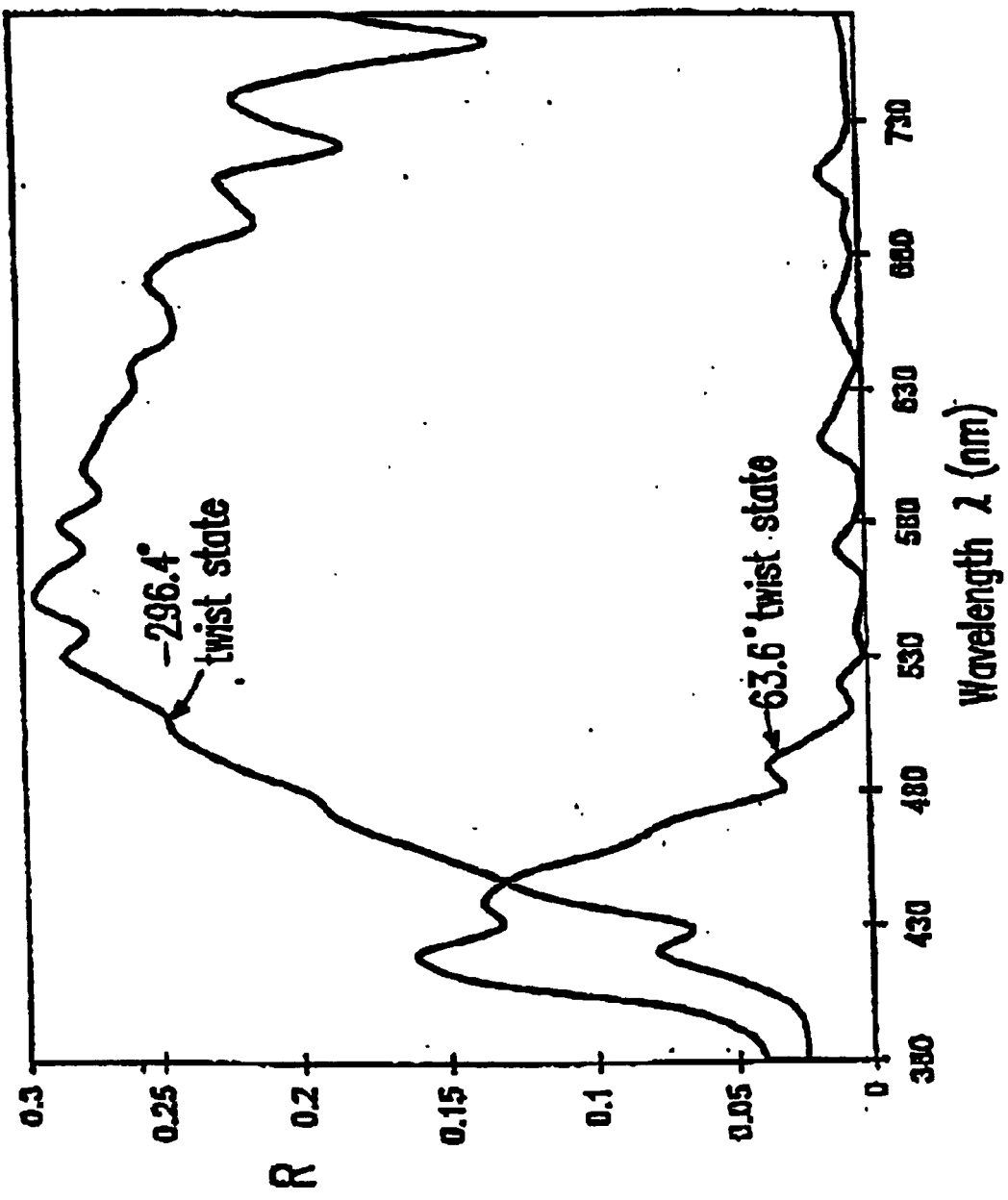
FIG. 16 shows a luminous reflectance versus wavelength plot for the configuration shown in FIG. 15, low twist dark state.
Figure 17:
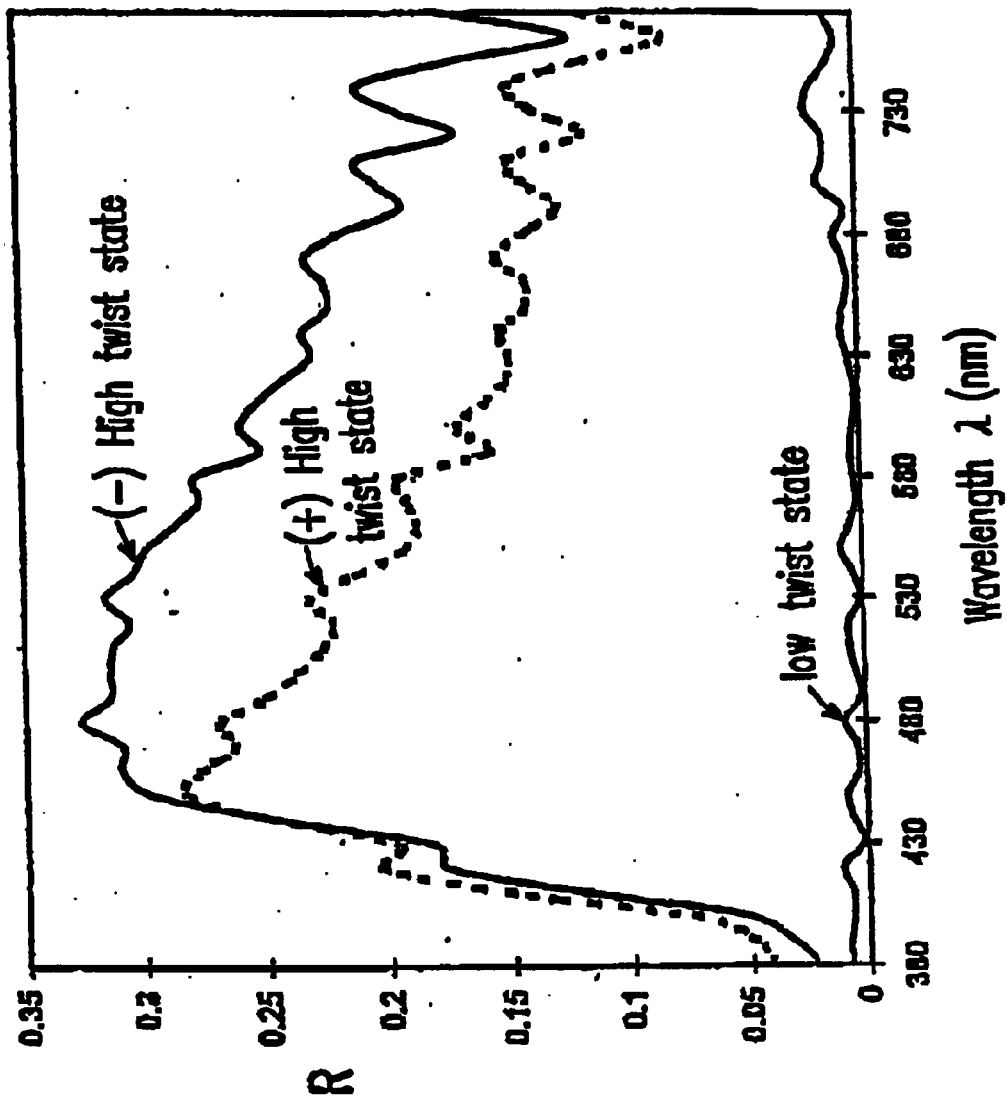
FIG. 17 shows a luminous reflectance versus wavelength plot for the configuration shown in FIG. 15; A retarder and LC thickness reduction of 30% provides the improved contrast.

The half-wave (λ/2) (Δn.d=270) retarder is at 15° to the transmission axis of the polariser with the LC layer oriented at 30° to the transmission axis of the polariser. A twist of φ=63.6° is incorporated to the LC layer and provides the dark state. The higher twist states (φ±360°) provides the bright state of which the (φ−360°)=−296.4° provides the better bright state. A diagram of this configuration is shown in FIG. 15. A contrast of 31.6 is obtained. The luminous reflectance curves shown in FIG. 16 suggest that the contrast would be higher were the curves shifted to the left. This can be achieved by reducing the thickness of the retarder and LC layer. For example, reducing both their thickness' by 30% resulted in a contrast of 66.5, over twice the previous contrast of 31.6. The luminous reflectance curves are shown in FIG. 17.

Embodiment 3
Half-wave (λ/2) LC+Internal Quarter-wave (λ/4) Retarder–untwisted Dark State (φ=0°)

Figure 18:
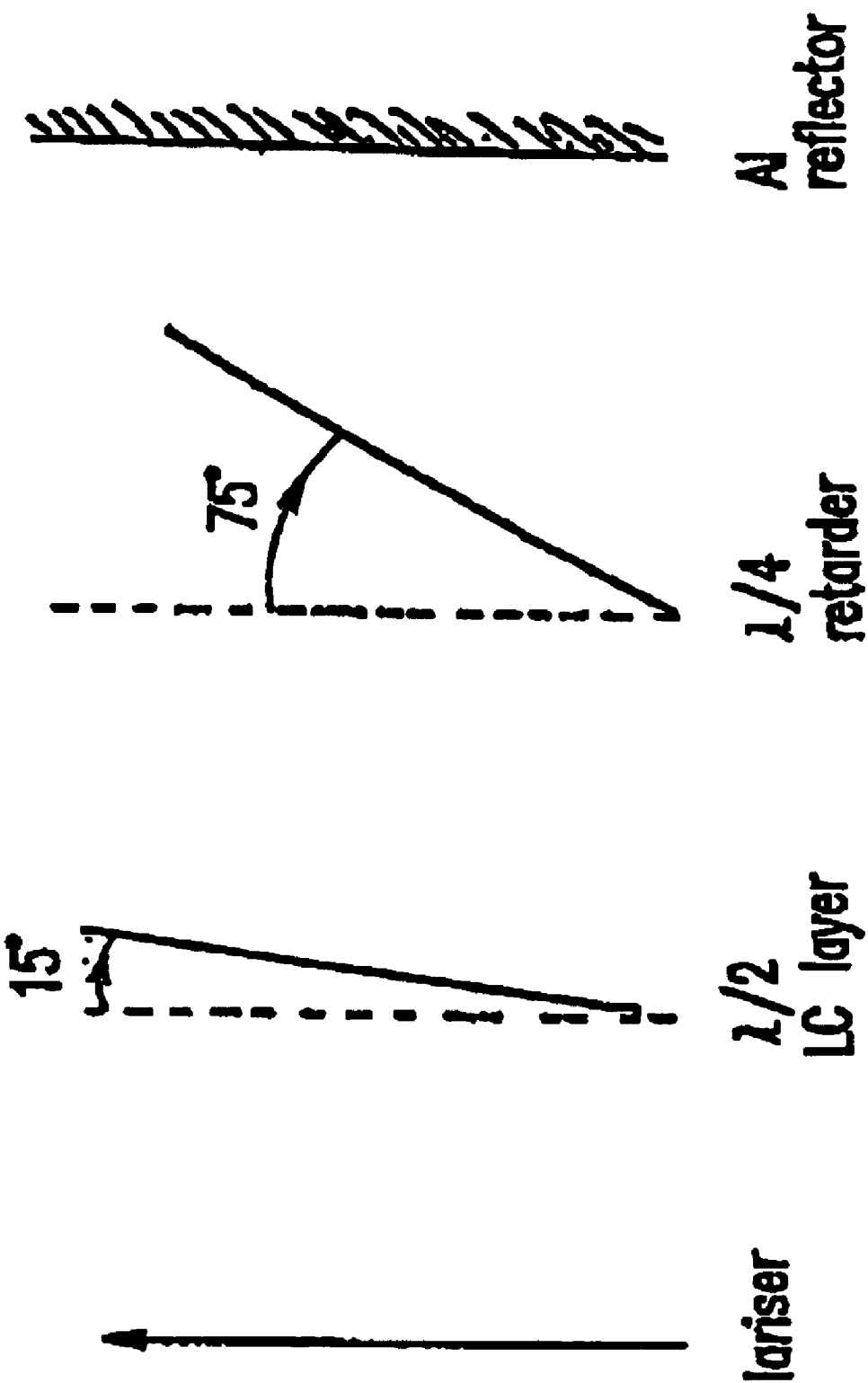
FIG. 18 shows a two-retarder configuration in reflection with an internal retarder described in Embodiment 3.
Figure 19:
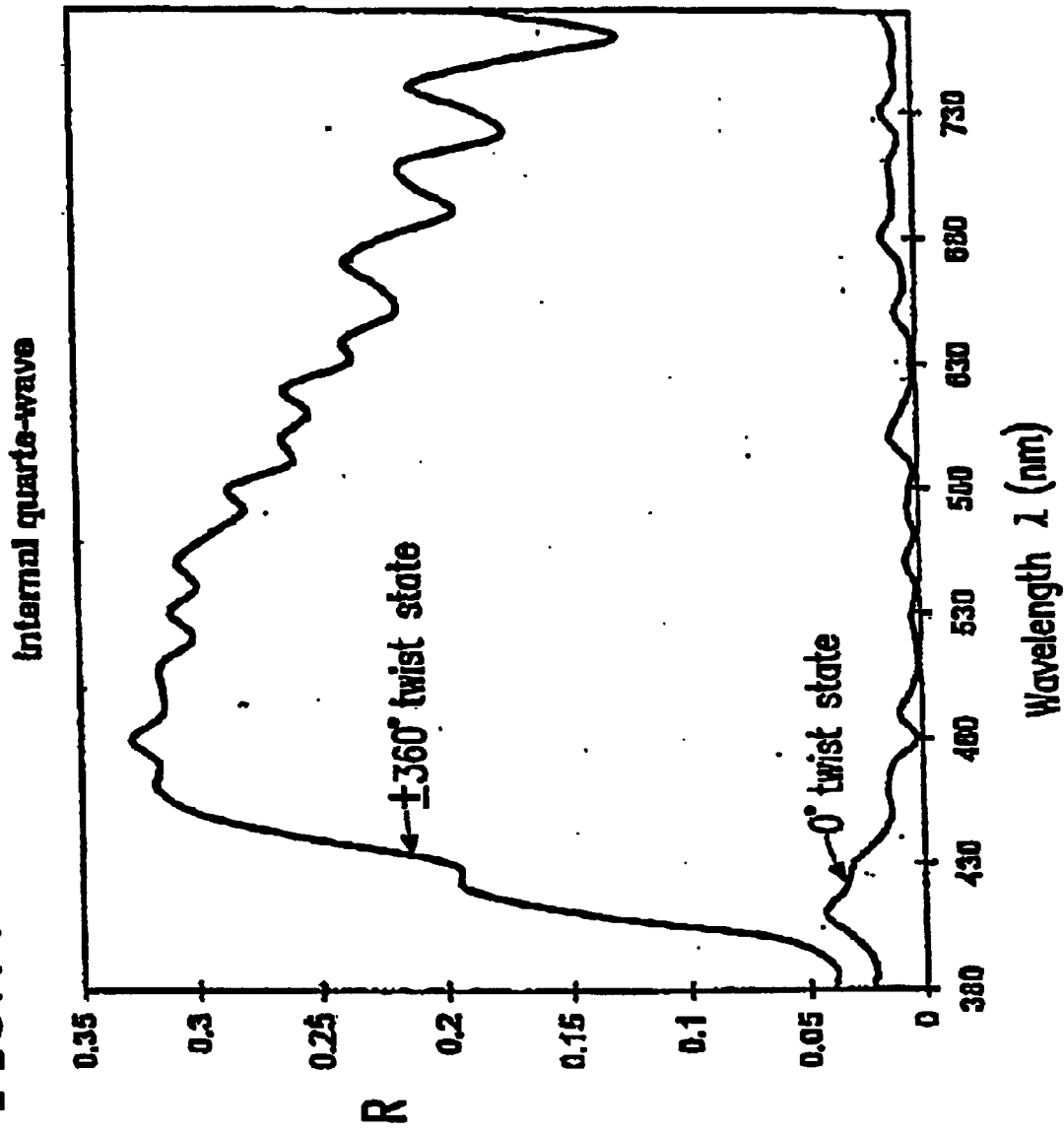
FIG. 19 shows a luminous reflectance VS wavelength plot for the configuration shown in FIG. 18, untwisted dark state.

This configuration is similar to Embodiment 1(a) except that the LC layer acts as the half-wave retarder (Δn.d=270) oriented at 15° to the transmission axis of the polariser. The LC layer thickness to 4 μm. A fixed quarter-wave retarder (Δn.d=132.5) at 75° to the transmission axis of the polariser is located between the LC layer and the reflector, see FIG. 18. The dark state corresponds to the untwisted state (φ=0°) and the high twist state (±360°) to the bright state, the ±360° have the same luminous reflectance. The luminous reflectance curves are shown in FIG. 19. A contrast of 64.6 is obtained.

The incorporation of an internal retarder inside a liquid crystal device is not an impractical technique, however it does increase the number of fabrication steps required.

The internal retarder can be fabricated using reactive mosogen (RM) materials, for example diacrylate RM257 (Merck Ltd, Poole). Reactive mesogens exhibit conventional liquid crystalline phases but undergo polymerisation under certain conditions, one of which being the exposure to ultraviolet light in a nitrogen atmosphere as the presence of oxygen inhibits the polymerisation reaction. Generally, a photoinitiator is required as a source of free radicals. Thus in the liquid crystalline phase the reactive mesogen can be aligned by an aligned alignment layer. The desired retardation can be obtained by tuning the spin conditions (layer thickness), the concentration of the reactive mesogen solution, the temperature at curing or a combination of all these.

The basic structure of the device can for example consist of a patterned aluminium (Al) reflector that doubles an the electrode, an aligned alignment layer on the reflector which aligns a reactive mesogen layer with the desired orientation and retardation. A second alignment layer can be placed on to the internal retarder. The device can be formed by combining this reflector-substrate with a counter substrate containing a patterned transparent patterned electrode, for example Indium tin oxide layer (ITO), coated by an (aligned) alignment layer to align the BTN LC layer. Additionally, a (patterned) transparent electrode may be placed on to the internal retarder (between the internal retarder and the alignment layer) in order to reduce the voltage drop that may occur across the internal retarder when using the reflector as the electrode.

Figure 20:
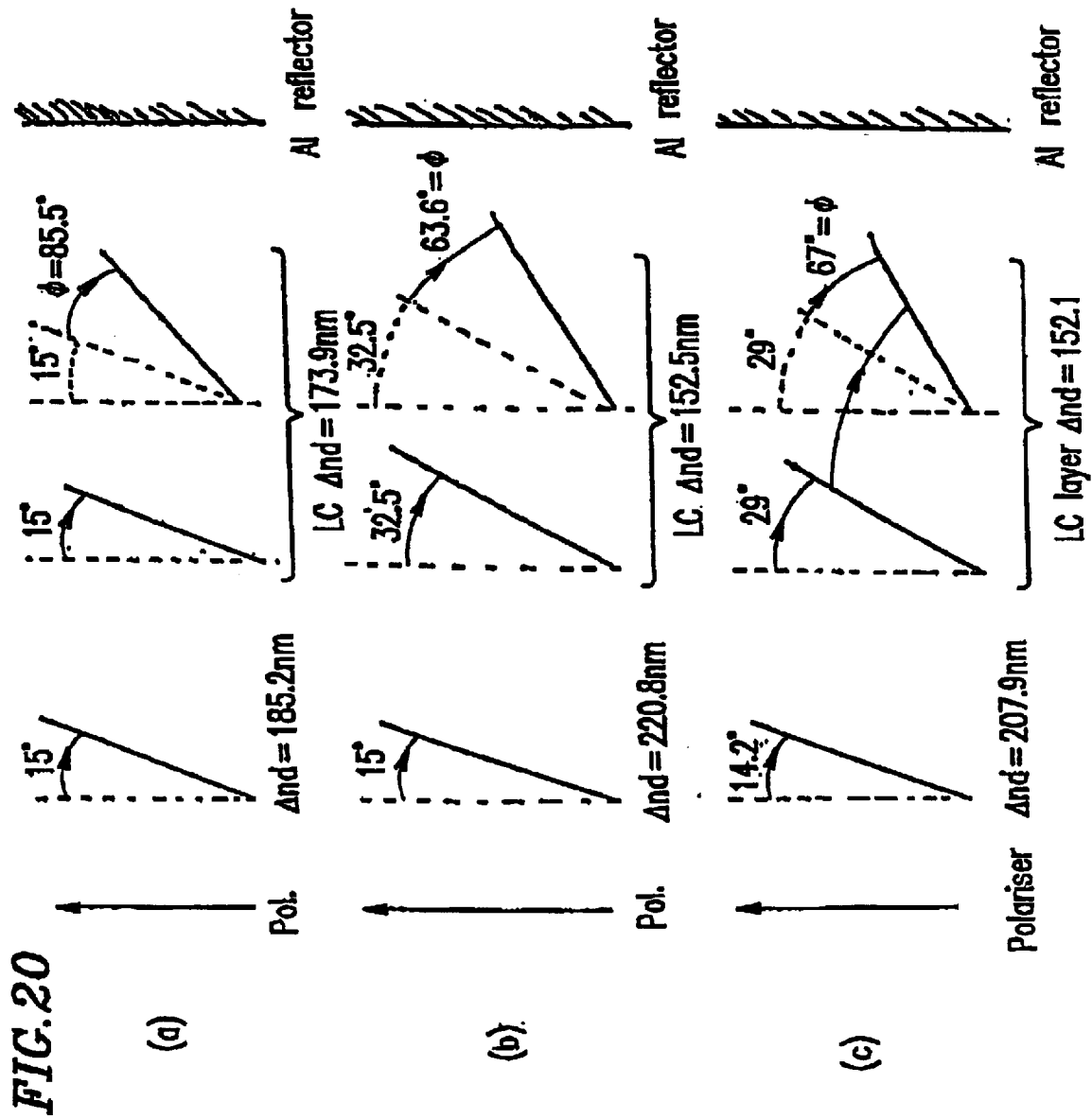
FIG. 20($a$) shows a two-retarder configuration in reflection described in Embodiment 4(a)
Figure 21:
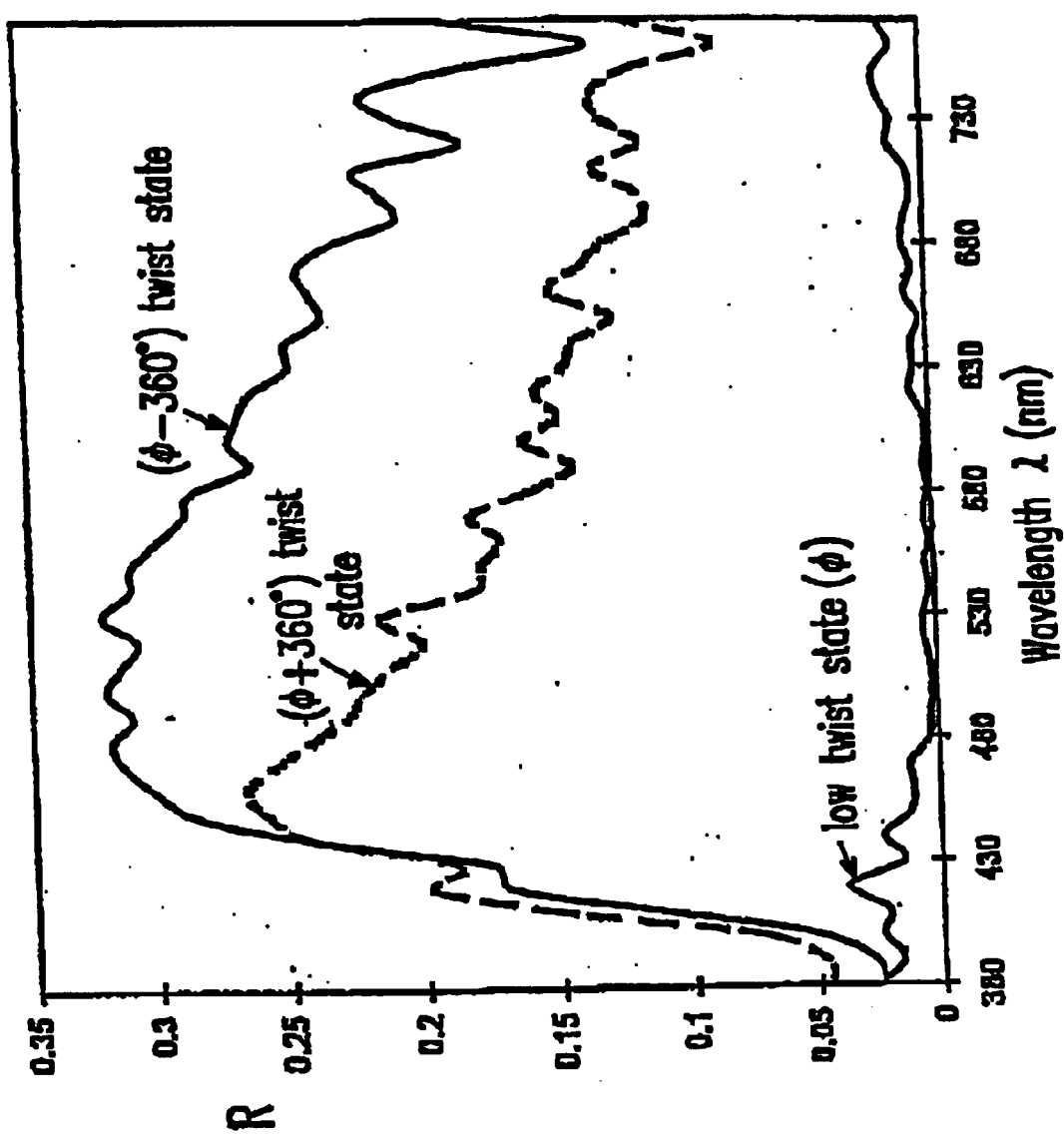
FIG. 21 shows a luminous reflectance versus wavelength plot for the configuration shown in FIG. 20($a$)

Embodiment 4
Specific Wavelength ($\lambda/2$) Retarder+Twisted LC Configurations–Low Twist Provides the Dark State $\phi$ Three such solutions were investigated and are shown schematically in FIG. 20, labelled (a) to (c). The LC layer is twisted through $\phi$ to give the dark state and the bright state corresponds to the higher twisted case ($\phi \pm 360°$). The optimum bright state was obtained for the ($\phi-360°$) twist state, providing reasonable contrasts:

(a) An untwisted fixed ($\Delta n.d=185$ nm) retarder and ($\Delta n.d=174$ nm, $d=2.54\ \mu m$) LC layer, are both orientated at 15° to the transmission axis of the polariser. The LC has a twist ($\phi$) of 85.5°. This configuration gives a contrast of 87 and the luminous reflectance curves are plotted in FIG. 21.

Figure 22:
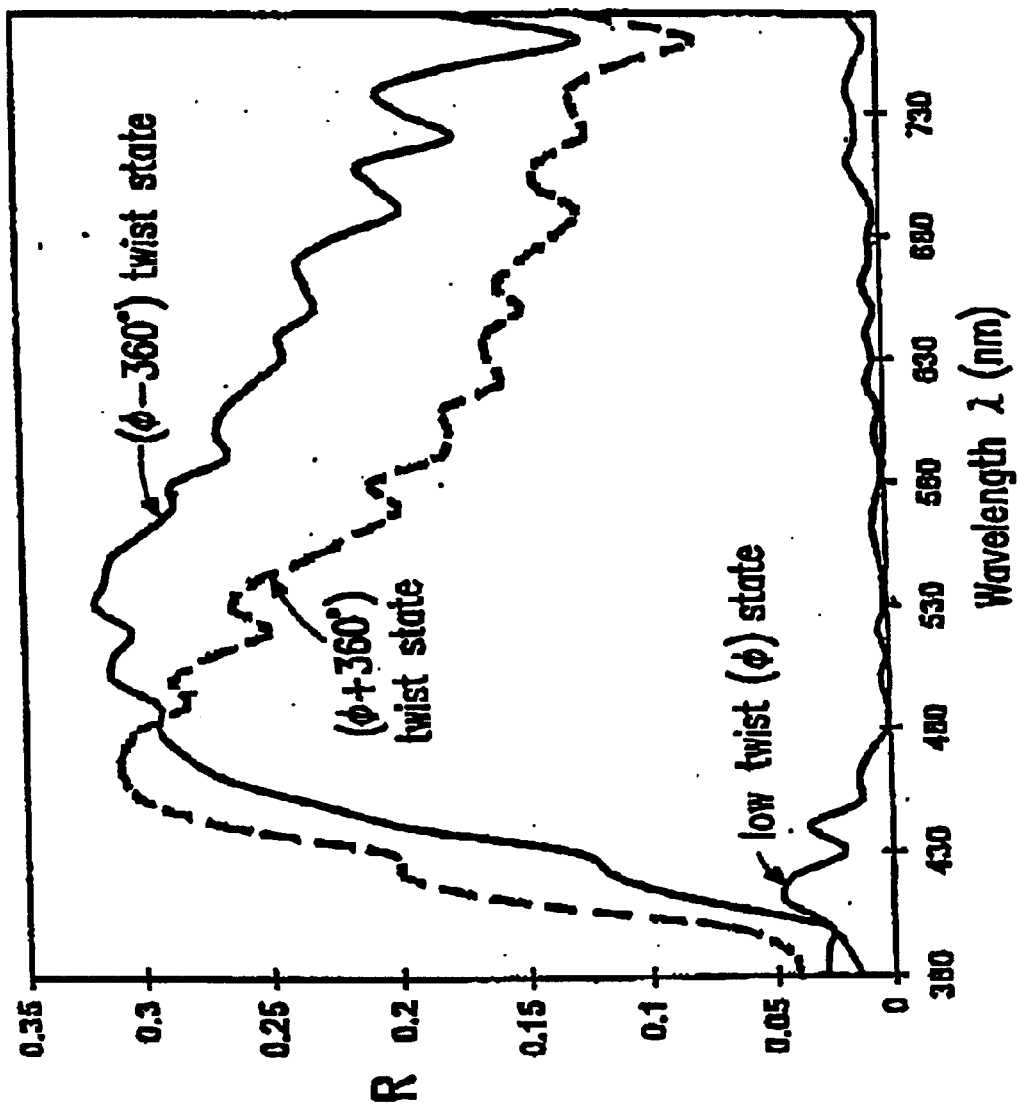
FIG. 22 shows a luminous reflectance VS wavelength plot for the configuration shown in FIG. 20($b$)

(b) The untwisted fixed ($\Delta nd=221$ nm) retarder is orientated at 15° to the transmission axis of the polariser and ($\Delta nd=152$ nm, $d=2.22\ \mu m$) LC layer is orientated at 32.5° to the transmission axis of the polariser with an internal twist ($\phi$) of 63.6°. The luminous reflectance curves are plotted in FIG. 22 and a contrast of 81 was obtained.

Figure 23:
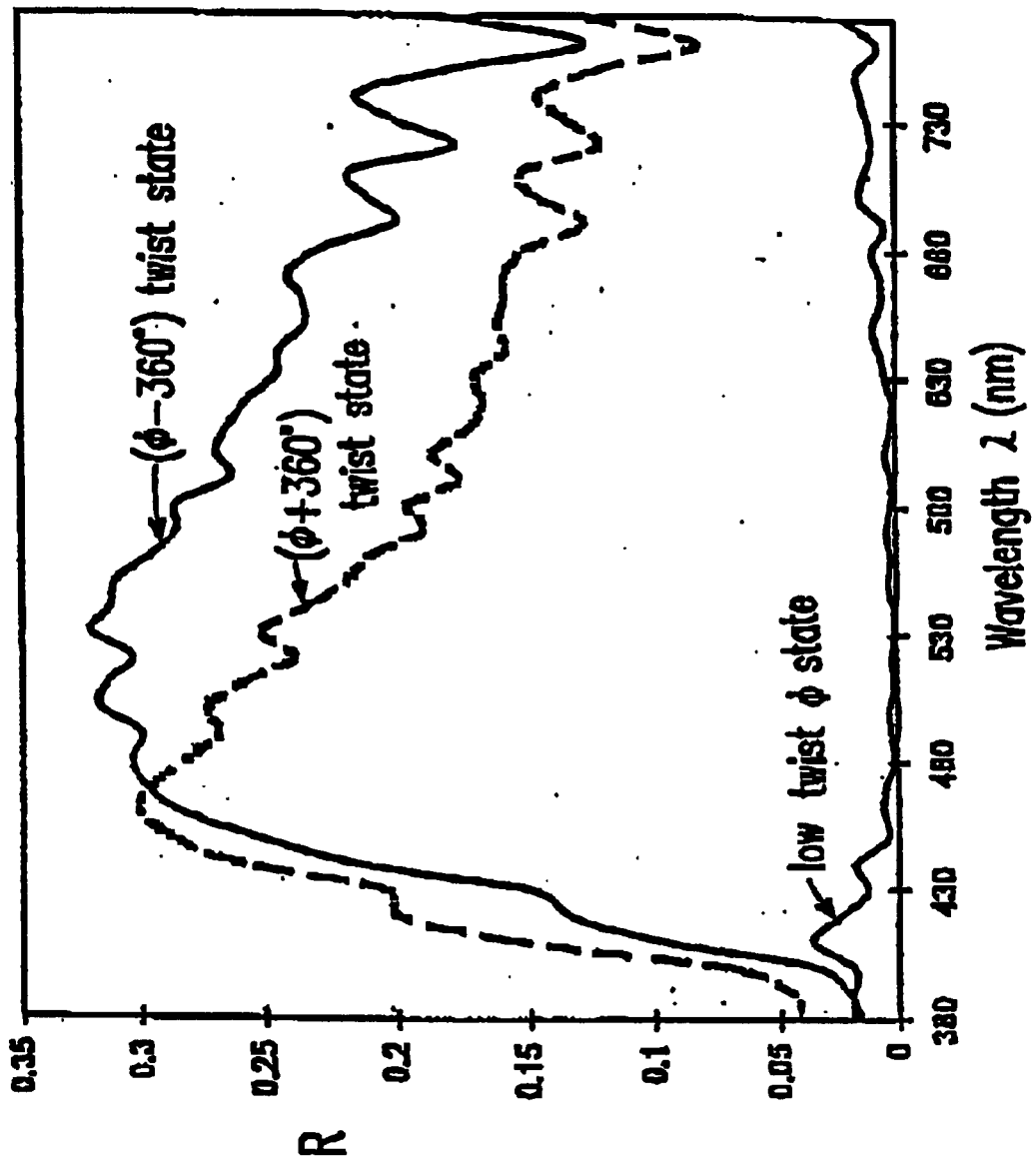
FIG. 23 shows a luminous reflectance versus wavelength plot for the configuration shown in FIG. 20($c$)

(c) The untwisted fixed ($\Delta nd=208$ nm) retarder is orientated at 14° to the transmission axis of the polariser and ($\Delta nd=152$ nm, $d=2.22\ \mu m$) LC layer is orientated at 29° to the transmission axis of the polariser with an internal twist ($\phi$) of 67°. The luminous reflectance curves are plotted in FIG. 23 and a high contrast of 99 was obtained.

Figure 24:
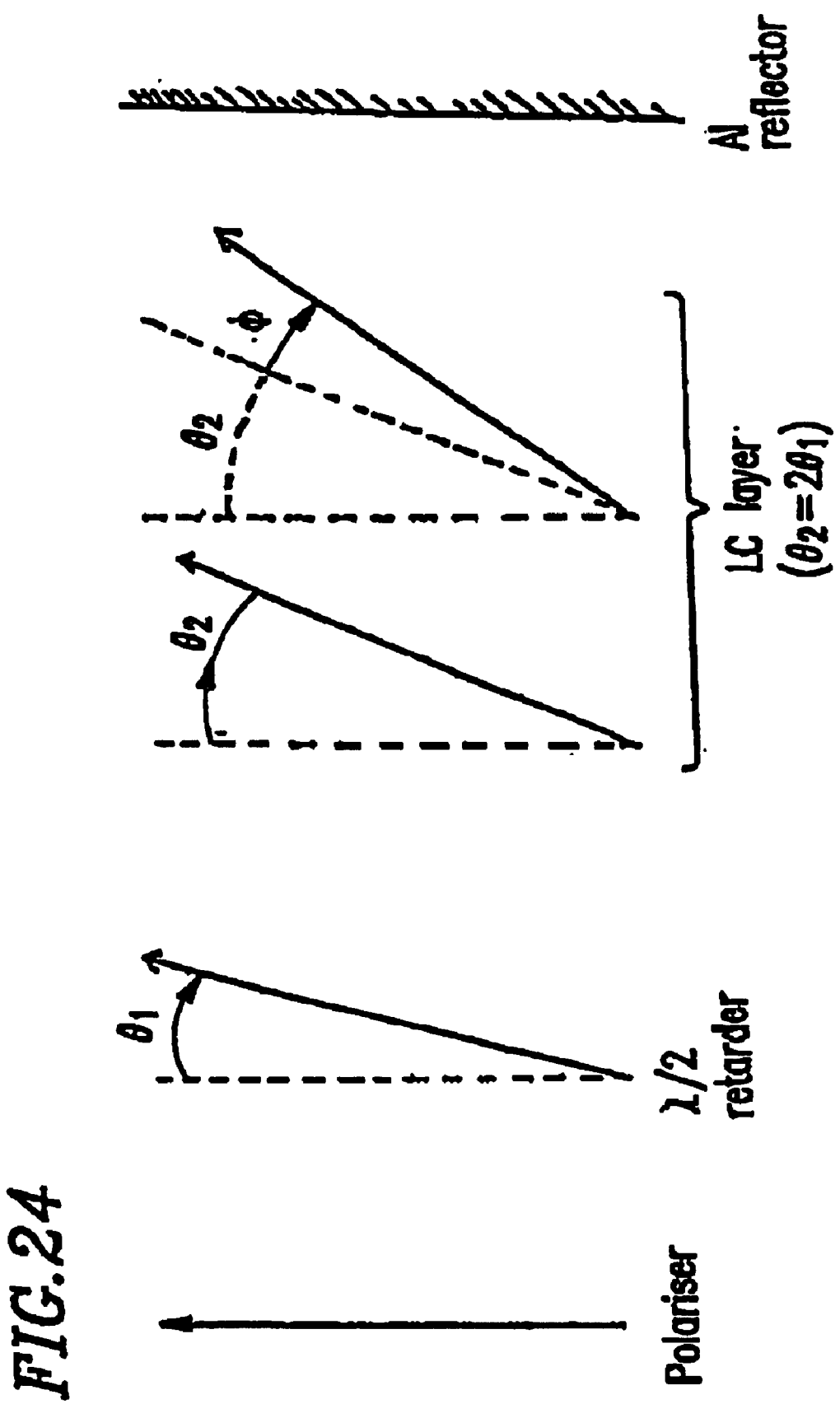
FIG. 24 shows a two-retarder configuration reflection described in Embodiment 5, $\theta_1$ varied.
Figure 25:
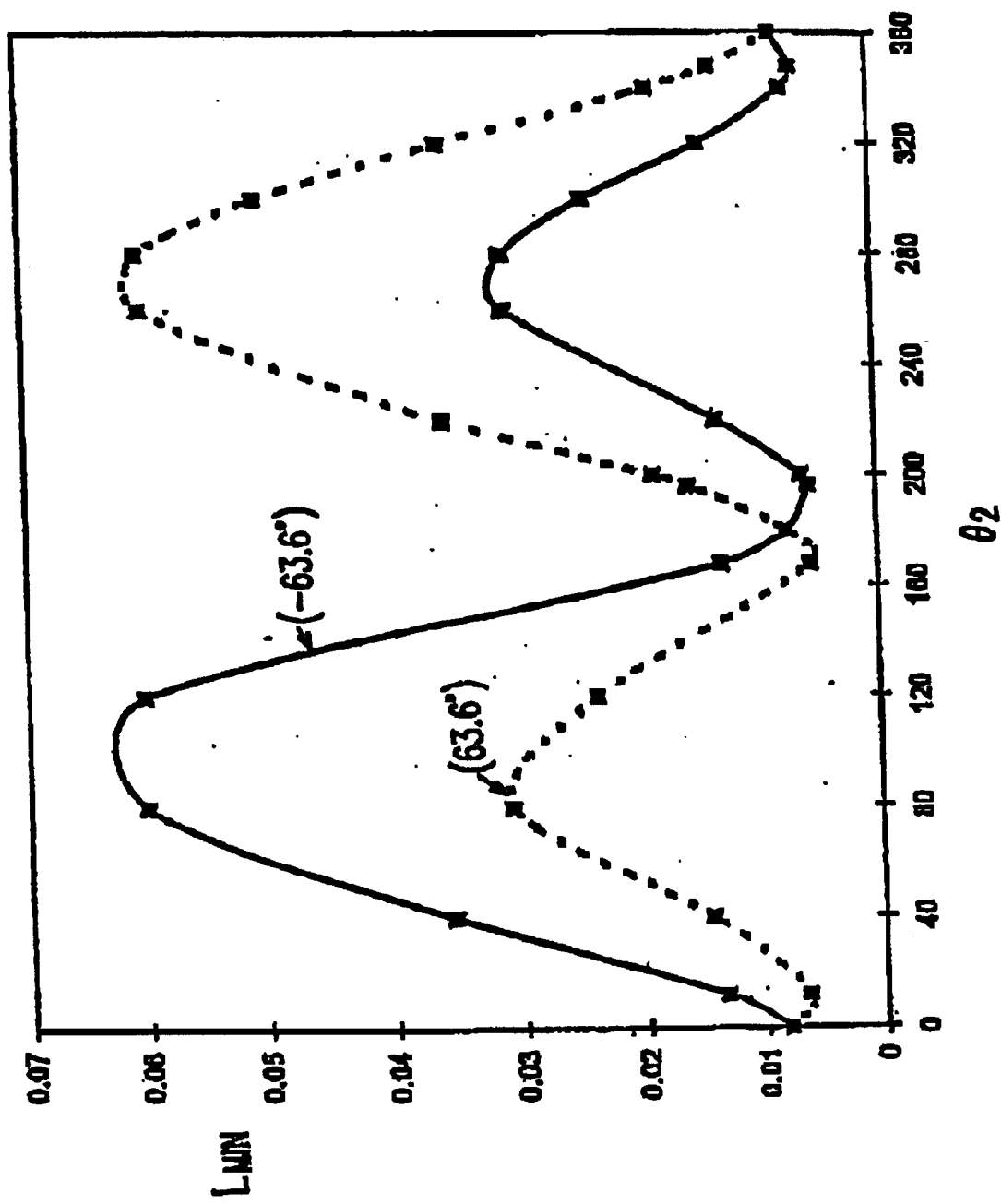
FIG. 25 shows a luminous reflectance values of the dark state given by the low twist metastable state $\phi$, as a function of $\theta_2$ (from 0° to 360°)

Embodiment 5
Configurations where the Angle ($\theta_1$) between Polariser and LC Layer Satisfies $\theta_2=2\theta_1$ where $\theta_1$ is the Angle between the Polariser and Half-wave Retarder–Low Twist State ($\phi$) Provides the Dark State These configurations are illustrated in FIG. 24: half-wave retarder ($\Delta n.d=270$) placed between the LC layer and polariser at an angle of $\theta_1$ to the transmission axis of the polariser and the LC layer is at $\theta_2$ to the transmission axis of the polariser where $\theta_2=2\theta_1$ (since the half-wave retarder rotates linear polarisation by $2\theta_1$); varying $\theta_1$ from 0° to 180° (i.e. $\theta_2$ from 0° to 360°), and calculating the luminous reflectance curves for the low twist (dark) state as a function of $\theta_2$ for a LC layer, thickness of 2.8 $\mu m$ and low twist state of $\phi=\pm63.6°$ selected from the table in FIG. 3. This LC layer configuration constitutes just one example chosen from the table in FIG. 3 and any thickness with its corresponding twist can be chosen and subjected to a similar procedure. A negative $\phi$ twist requires the values of $\theta_1$ and all corresponding angles to be reversed in sign. The luminous reflectance values for the low twist state are plotted as a function of $\theta_2$ in FIG. 25. These results indicate that a positive low LC layer twist provides a lower luminance (better dark state) over the 0° to 180° range for $\theta_2$ than an equivalent negative LC layer twist.

Figure 26:
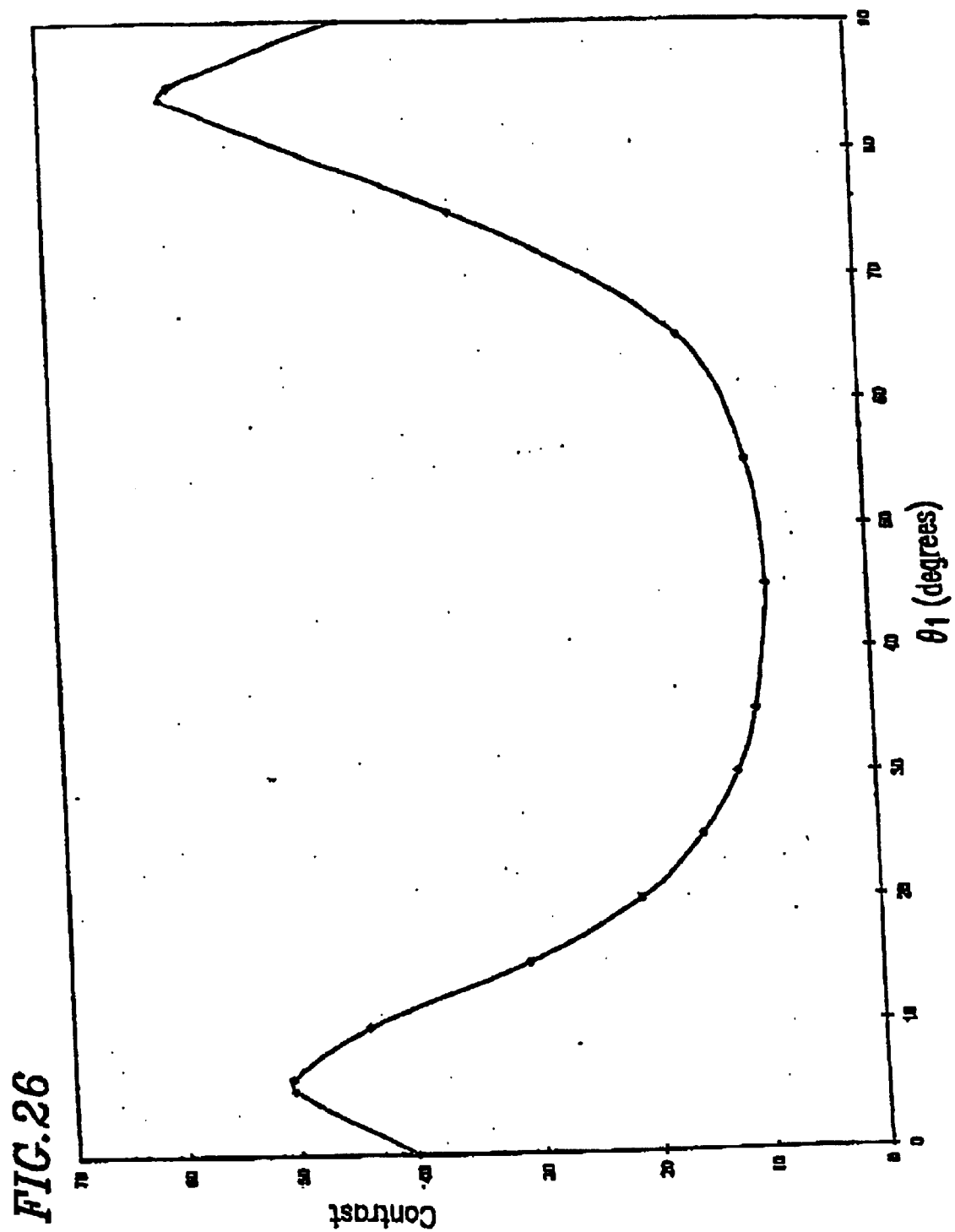
FIG. 26 shows a contrast plot obtained as a function of $\theta_1$ (angle between polariser and half-wave retarder, see FIG. 24) from 0° to 90°.
Figure 27:
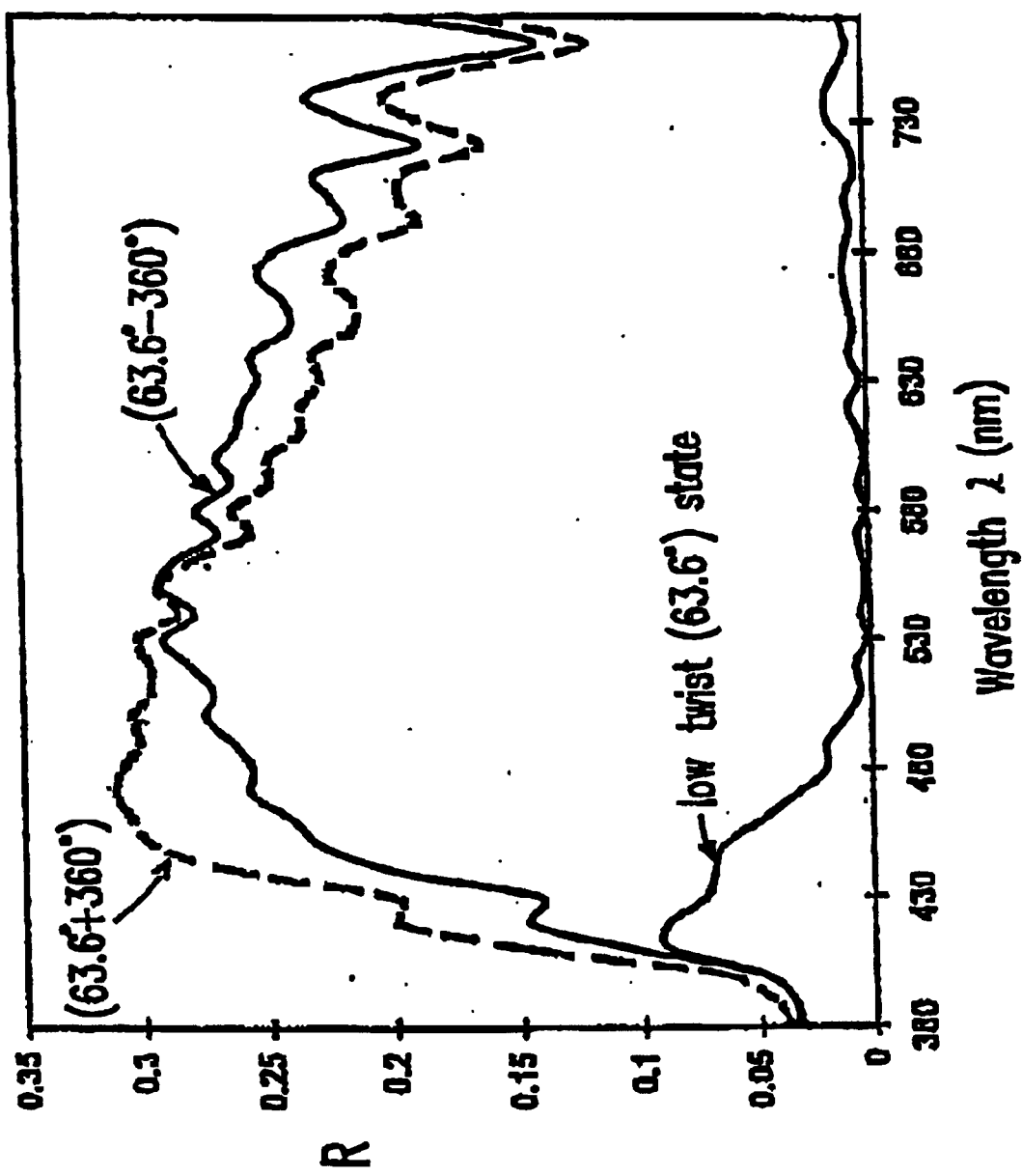
FIG. 27 shows a luminous reflectance versus wavelength plot for $\theta_1$=6°, Embodiment 5.
Figure 28:
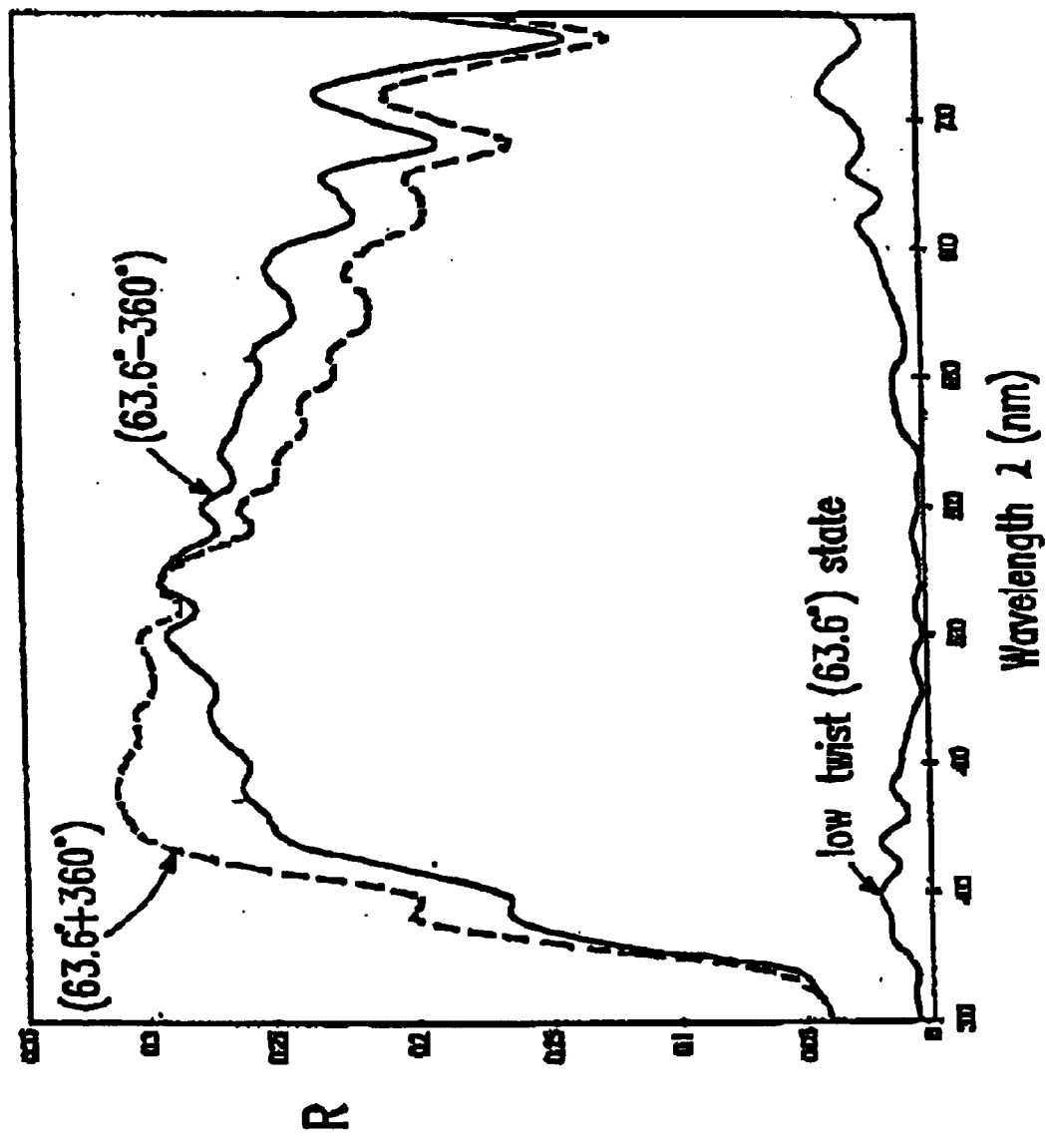
FIG. 28 shows a luminous reflectance versus wavelength plot for $\theta_1$=84°, Embodiment 5.

The resulting contrast were calculated as a function of $\theta^1$ and shown in FIG. 26. Two regions were found to give good contrasts, $\theta_1=6°$ & 84°, with respective contrast of 50.5 and 59. The luminous reflectance curves for $\theta_1=6°$ are shown in FIG. 27, the dark state has a high luminous reflectance at low wavelengths which lowers the overall contrast, even though at higher wavelengths the dark state looks very achromatic. An improved dark state at low wavelength can be obtained by shifting the curves to the left by reducing the retarder and LC layer thickness as demonstrated in Embodiment 2. The dark state at $\theta_1=84°$ has a lower leakage of light at short wavelengths ($\lambda<450$ nm) than the dark state at $\theta_1=6°$, see the luminous reflectance curves in FIG. 28, resulting in an overall higher contrast even though the wavelength range over which both these dark states have a minimum transmission of light is the same.

This exercise can be repeated for different retarder and LC layer thickness' (and hence different LC layer twist) to try and improve the contrast and/or increase the LC layer' thickness.

Figure 29:
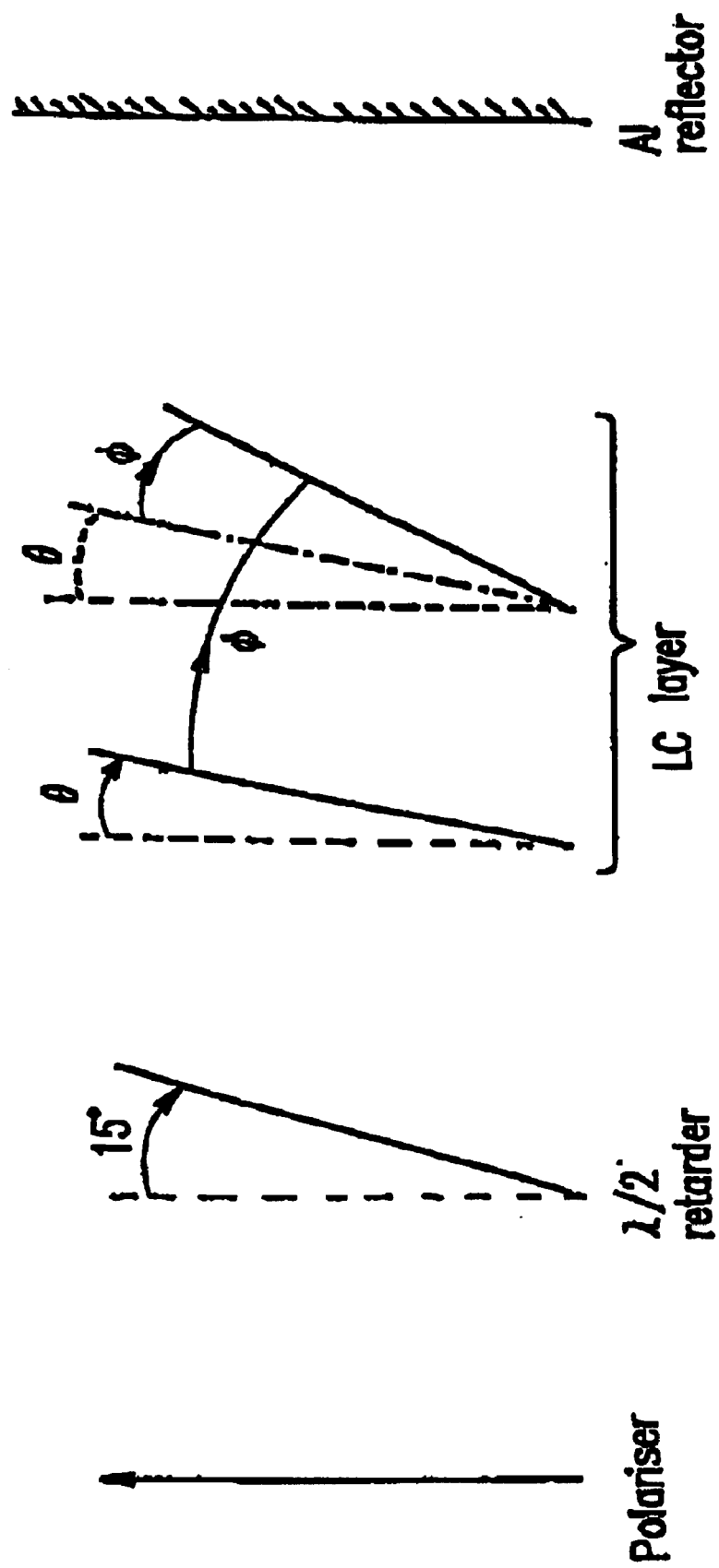
FIG. 29 shows a two-retarder configuration in reflection described in Embodiment 6, d, $\theta$ and $\phi$ are varied.
Figure 31:
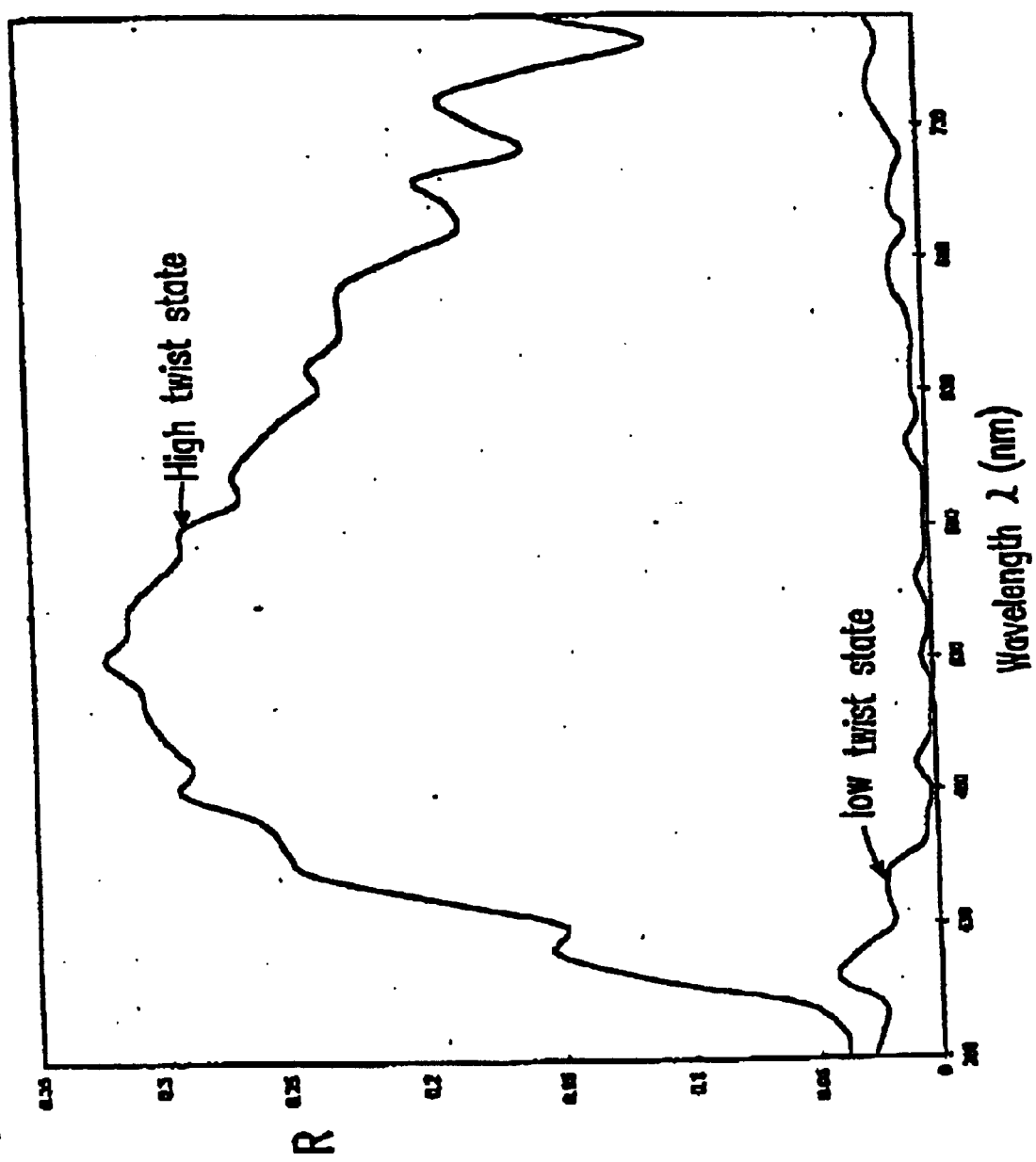
FIG. 31 shows a luminous reflectance versus wavelength plot for $\Delta n.d/\lambda$=0.25, d=2 $\mu$m, Embodiment 6.

Embodiment 6
Fixed Half-wave ($\lambda/2$) Retardar+Variable Thickness LC Layer–Low Twist ($\phi$) Provides Dark State This arrangement is shown in FIG. 29, a half-wave retarder ($\Delta n.d=270$) at 15° to the transmission axis of the polariser. The LC layer to placed between the retarder and reflector and the low twist state provides the dark state. The thickness of the LC layer is selected from the table of LC configurations in FIG. 3 (between $\Delta n.d/\lambda=0.25$ & 0.75) and for each thickness the configuration (orientation $\theta$ and twist $\phi$) giving the best dark state was determined via locating the minima on a 3-D surface plot. The contrast as a function of LC layer thickness was obtained. These contrasts are plotted as a function of $\Delta n.d/\lambda$ (birefringence $\Delta n$, thickness d, wavelength $\lambda$) in FIG. 30. As $\Delta n.d/\lambda$ increases the contrast rapidly decreases. A maximum contrast of 89 was obtained, corresponding to a $\Delta nd/\lambda=0.25$, $d=2\ \mu m$, $\theta=81°$, $\phi=11°$. The corresponding luminous reflectance curves for $\phi=11°$ and $\phi=349°$ twist states are given in FIG. 31. The ($\phi+360°$) high twist state gave a higher luminance than the ($\phi-360°$) high twist state.

Further improvements are possible by varying the retardation (thickness) of the fixed half-wave retarder and repeating this exercise.

Figure 32:
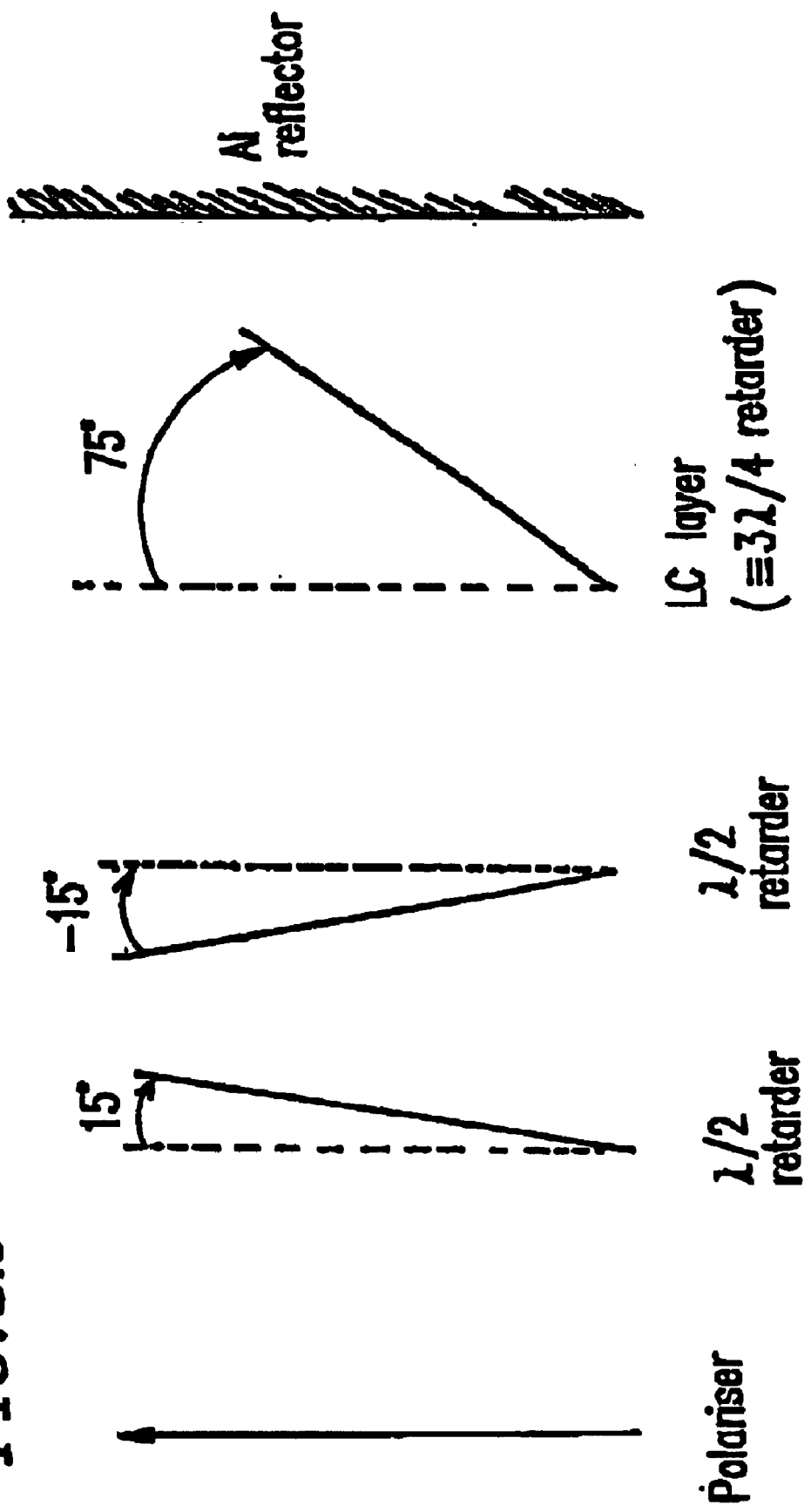
FIG. 32 shows a three-retarder configuration in reflection described in Embodiment 7.
Figure 33:
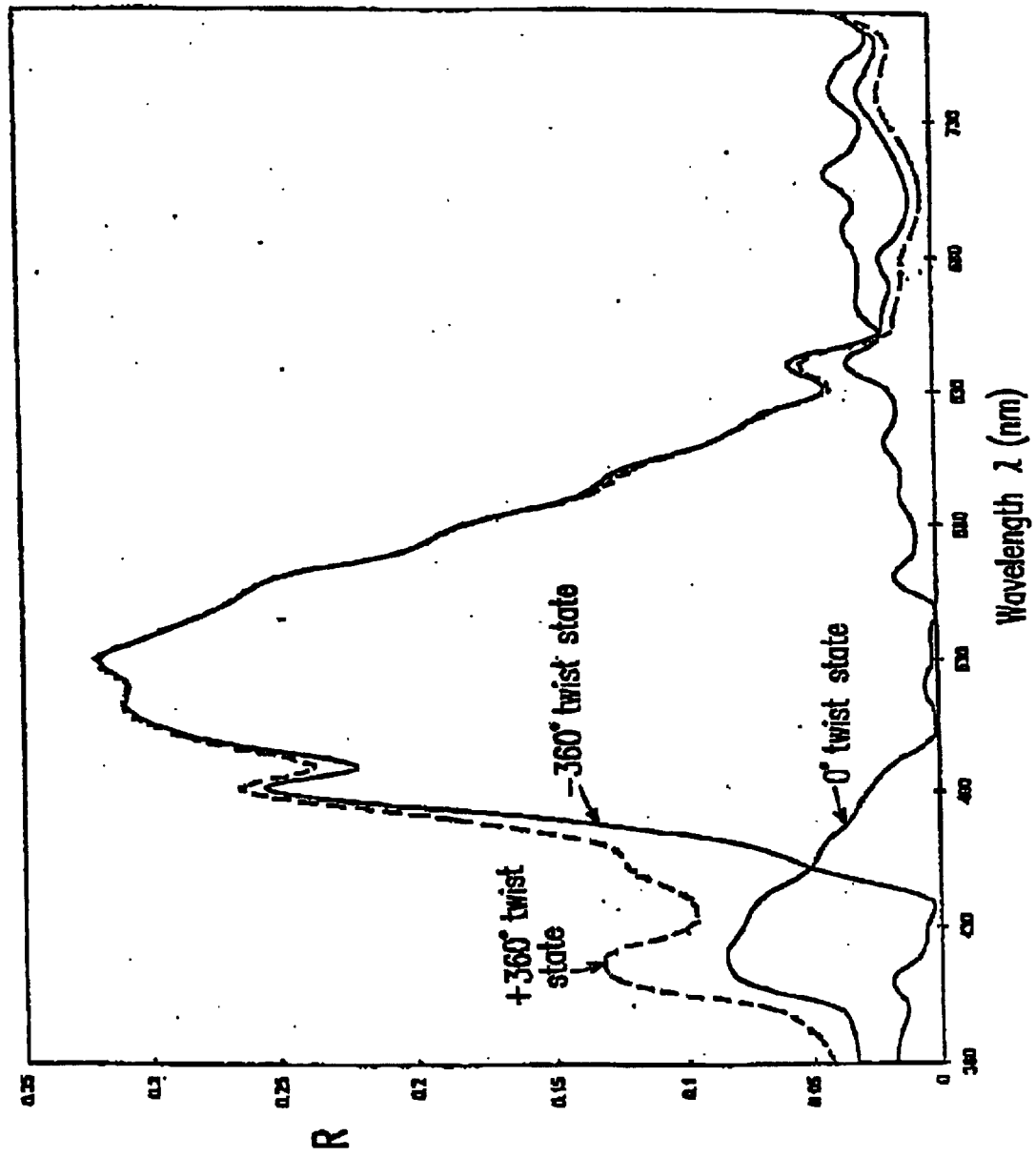
FIG. 33 shows a luminous reflectance versus wavelength plot for configuration shown in FIG. 32. Untwisted state provides the dark state.

Embodiment 7
Two Half-wave ($\lambda/2$) Retarders+($3\lambda/4$) LC–Untwisted Dark State $\phi=0°$ Two Half-wave Retarders ($\Delta n.d=270$) placed at 15° and $-15°$ to the transmission axis of the polariser with a 6 $\mu m$ LC layer at 75°, as shown in FIG. 32. The untwisted state corresponds to the dark state and the high twist state gives the bright state. The resulting dark and bright states are not very achromatic, see reflectance curves plotted in FIG. 33, leading to a low contrast of 20. Dark state has a short 500–550 nm wavelength range. The luminous reflectance curves (e.g. 0° and $-360°$ twist states) are very chromatic which may be usable as a two colour display (achromatic dark state and coloured bright state).

Embodiment 7 Can Be Seen as Belonging to a More General Case ($\lambda/2$)$\theta$–15°+[($\lambda/4$)+$x$]$\theta$~–15°+[($\lambda/2$)+$x$]$\theta$–75° where $x$ lies between 0 & $\lambda/4$.

Figure 34:
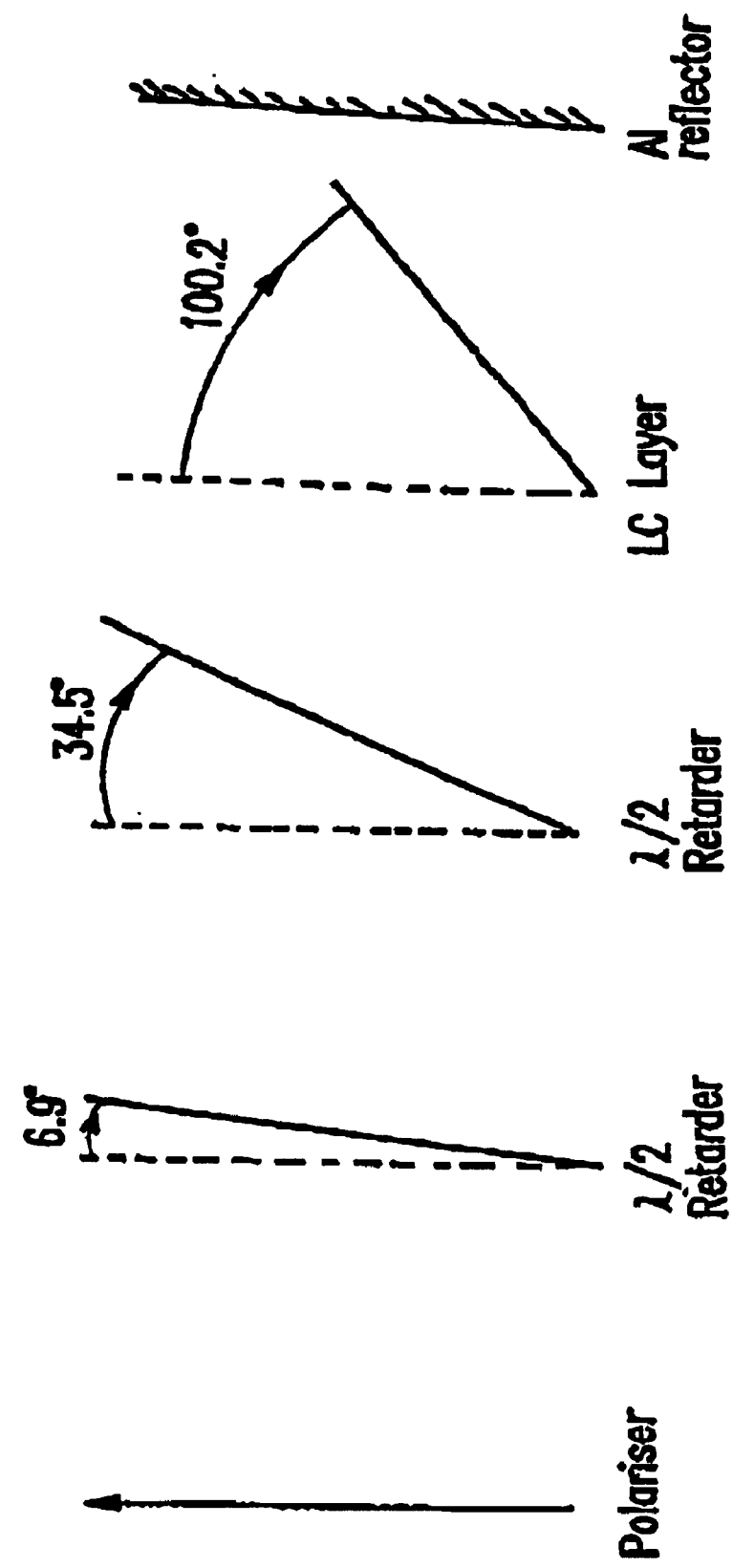
FIG. 34 shows a three-retarder configuration in reflection, described in Embodiment 8, d=2 $\mu$m.
Figure 35:
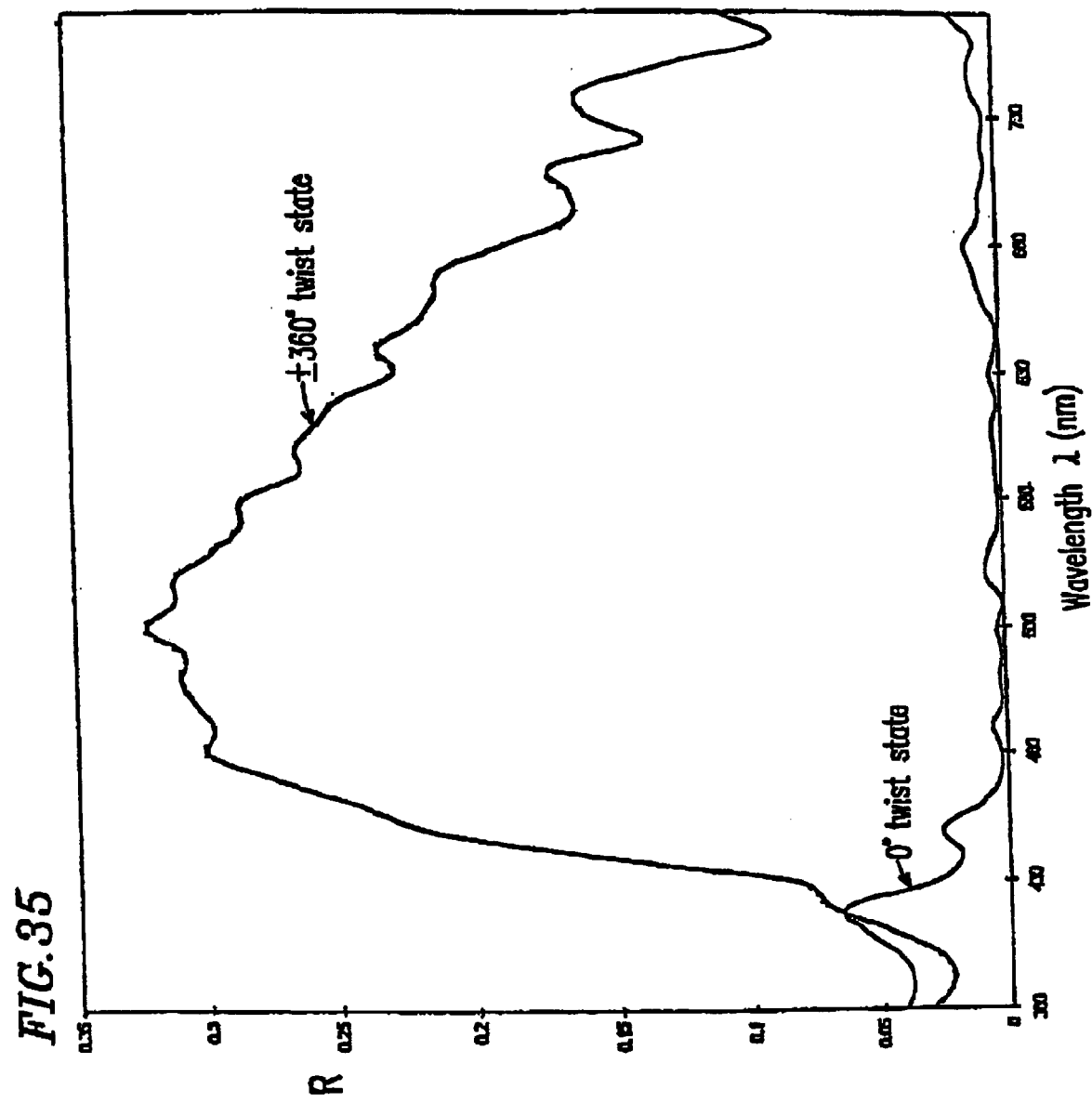
FIG. 35 shows a luminous reflectance versus wavelength plot for configuration shown in FIG. 34. Untwisted state provides the dark state.

Embodiment 8
Two Half-wave ($\lambda/2$) Retarders+($\lambda/4$) LC–Untwisted Dark State $\phi=0°$ The two half-wave retarders ($\Delta n.d=270$) are at 6.9° and 34.5° to the transmission axis of the polariser, as shown in FIG. 34. An untwisted, 2 $\mu m$ LC layer, at 100° to the transmission axis of the polariser, provides a good achromatic dark state (minimum reflectance over ~180 nm wide wavelength range), with the exception that at very low wavelengths the dark state becomes poor, see FIG. 35. The high twist (±360°) state in turn gives a good bright state (though chromatic in behaviour) which leads to a contrast of 89. The dark state may be improved (possibly increasing the contrast) by decreasing the thickness of the retarders and LC layer.

Additionally, increasing the thickness of the LC layer and determining for that thickness the optimum (θ orientation and φ twist of LC layer) configuration as described in Embodiment 6, other high contrasts may be found. It could also be possible to increase the thickness of the LC layer by using the LC as one of the (λ/2) elements instead of the (λ/4) element, though this would require an internal retarder which could be fabricated by a reactive mesogen layer as described in Embodiment 3.

Embodiment 9

A (23λ/72) and (λ/2) Retarder+LC (23λ/72)–Untwisted Dark State φ=0°

Figure 36:
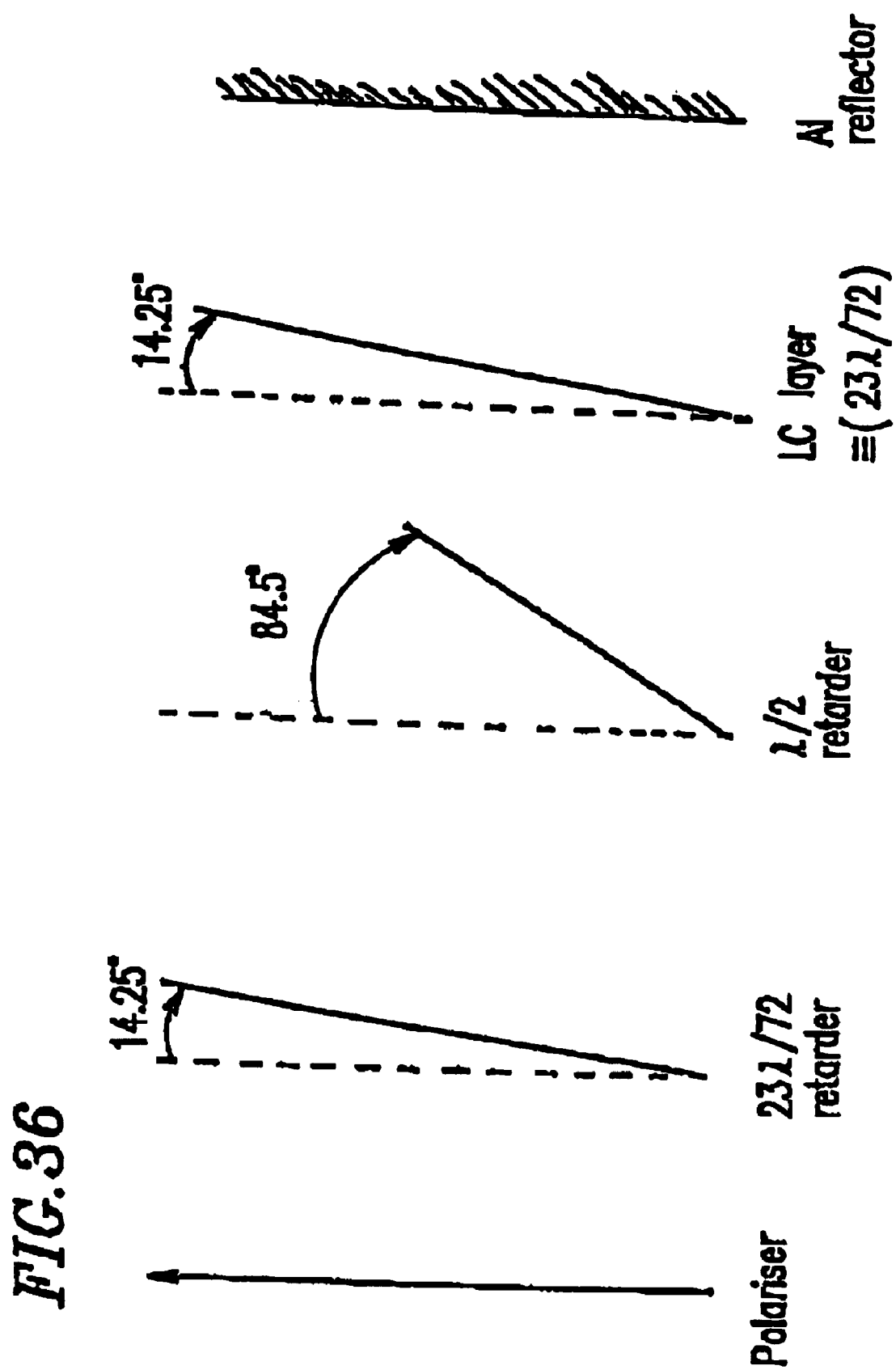
FIG. 36 shows a three-retarder configuration in reflection described in Embodiment 9, d=2.56 $\mu$m.
Figure 37:
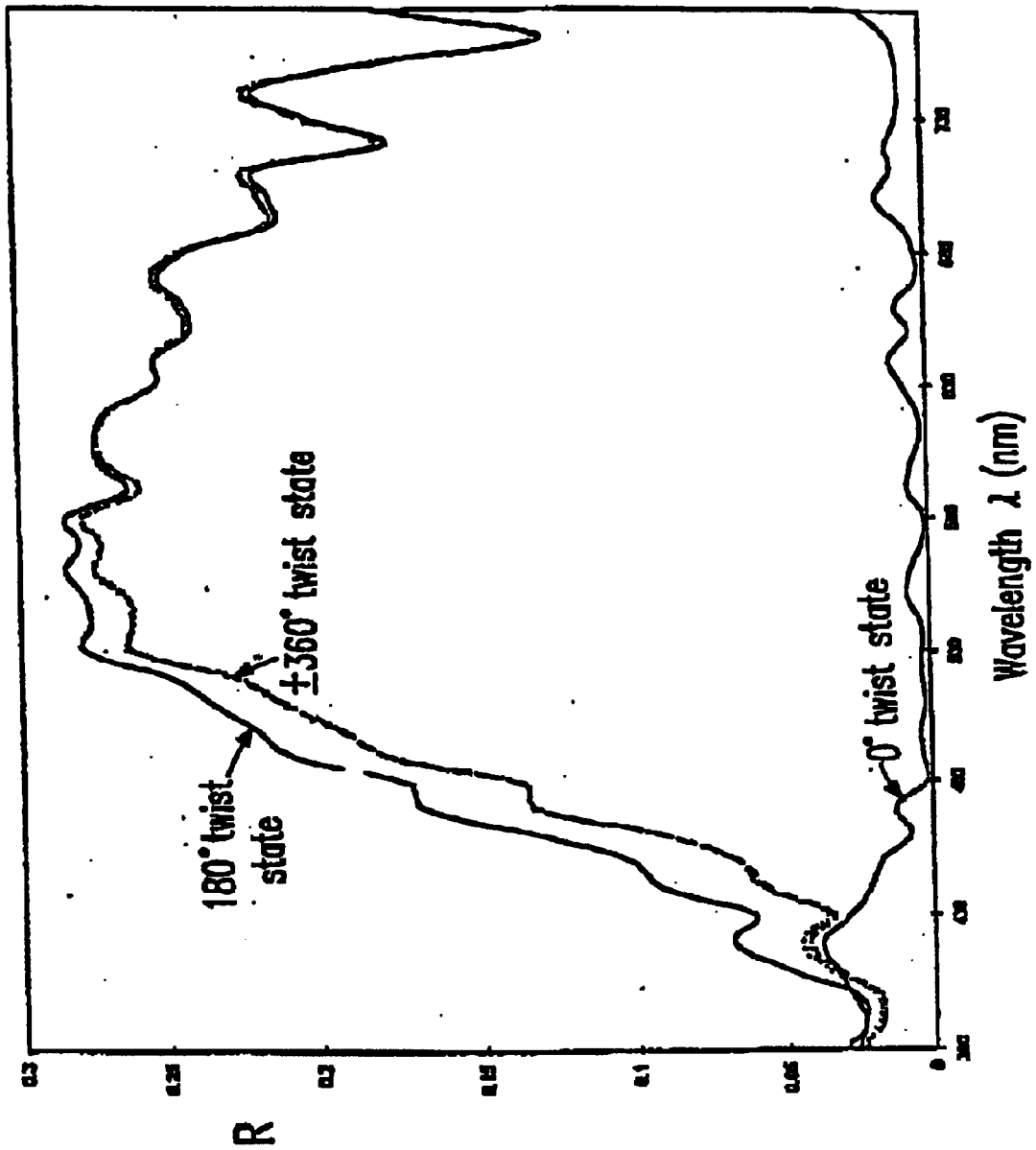
FIG. 37 shows a luminous reflectance versus wavelength plot for configuration shown in FIG. 36; untwisted state provides the dark state, the bright state $\phi$+180° twist state and $\phi$±360° twist states are also plotted.

A 23λ/72 (θ550 nm) retarder placed at 14.25° to the transmission axis of the polariser followed by a half-wave (Δn.d=270) retarder at 84.5°. The LC is oriented at 14.25° and has a retardation of ~23λ/72 (d=2.56 μm). FIG. 36 gives a schematic representation of this configuration. The dark state is given by the untwisted state φ=0°. The bright state is obtained by the high twisted (±360°) state, though the undesired ±180° twist state gave a higher luminance than the ±360° twist state, as can be seen in FIG. 37. A contrast of 55 is obtained.

The thickness of the LC layer could be increased by using the LC as the (λ/2) element instead of the (23λ/72) element, though this again would require an internal retarder.

Embodiment 10

Achromatic Configuration+LC: (λ/2) Retarder+(λ/4) Retarder+(λ/4) LC Layer

This configuration is different to all the previous configurations discussed because the fixed retarder(s) provide the dark state and the LC is used to switch their effect on and off. Therefore, the high twist state gives the dark state and the low twist state gives the bright state.

Figure 38:
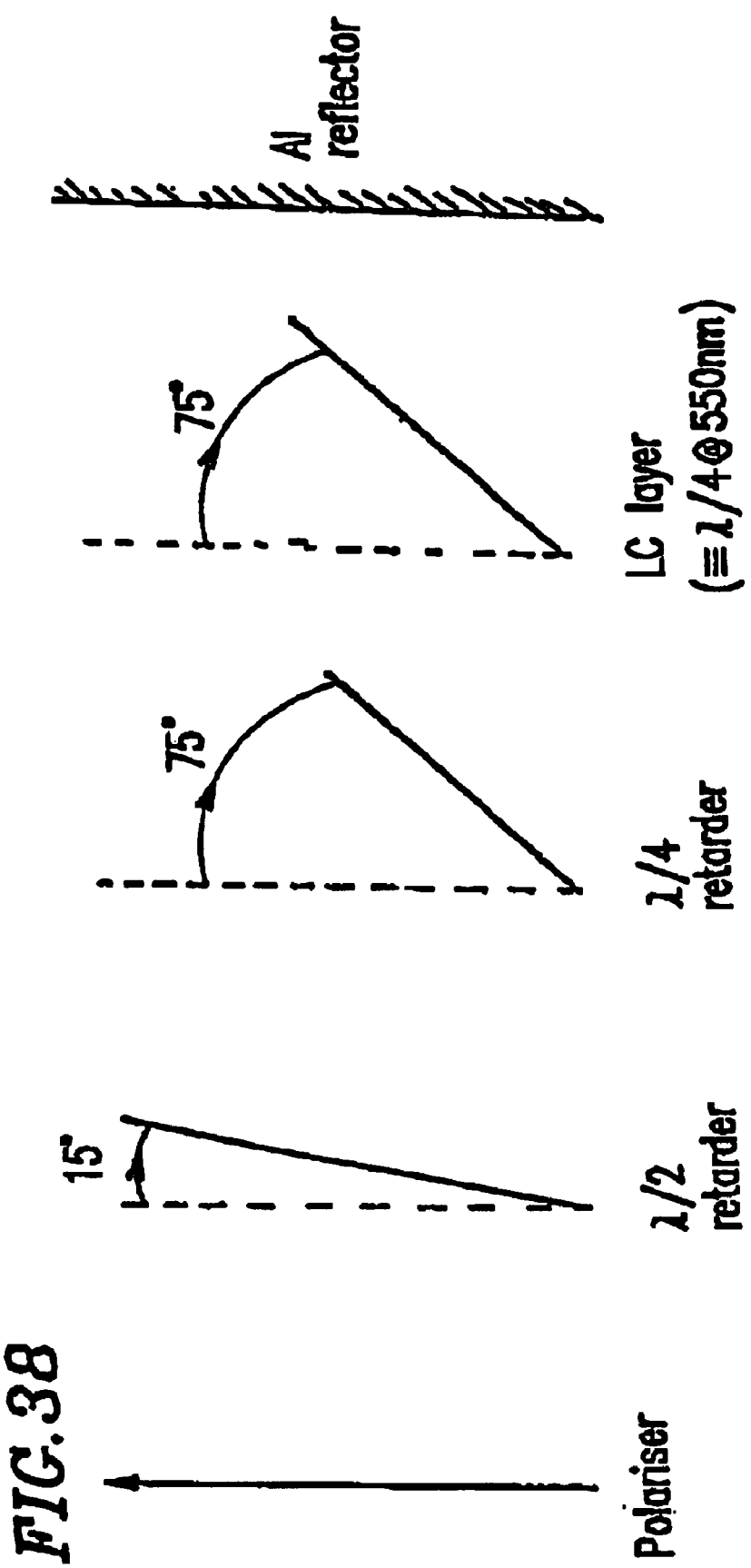
FIG. 38 shows a three-retarder achromatic configuration in reflection described in Embodiment 10, d=2 $\mu$m.
Figure 39:
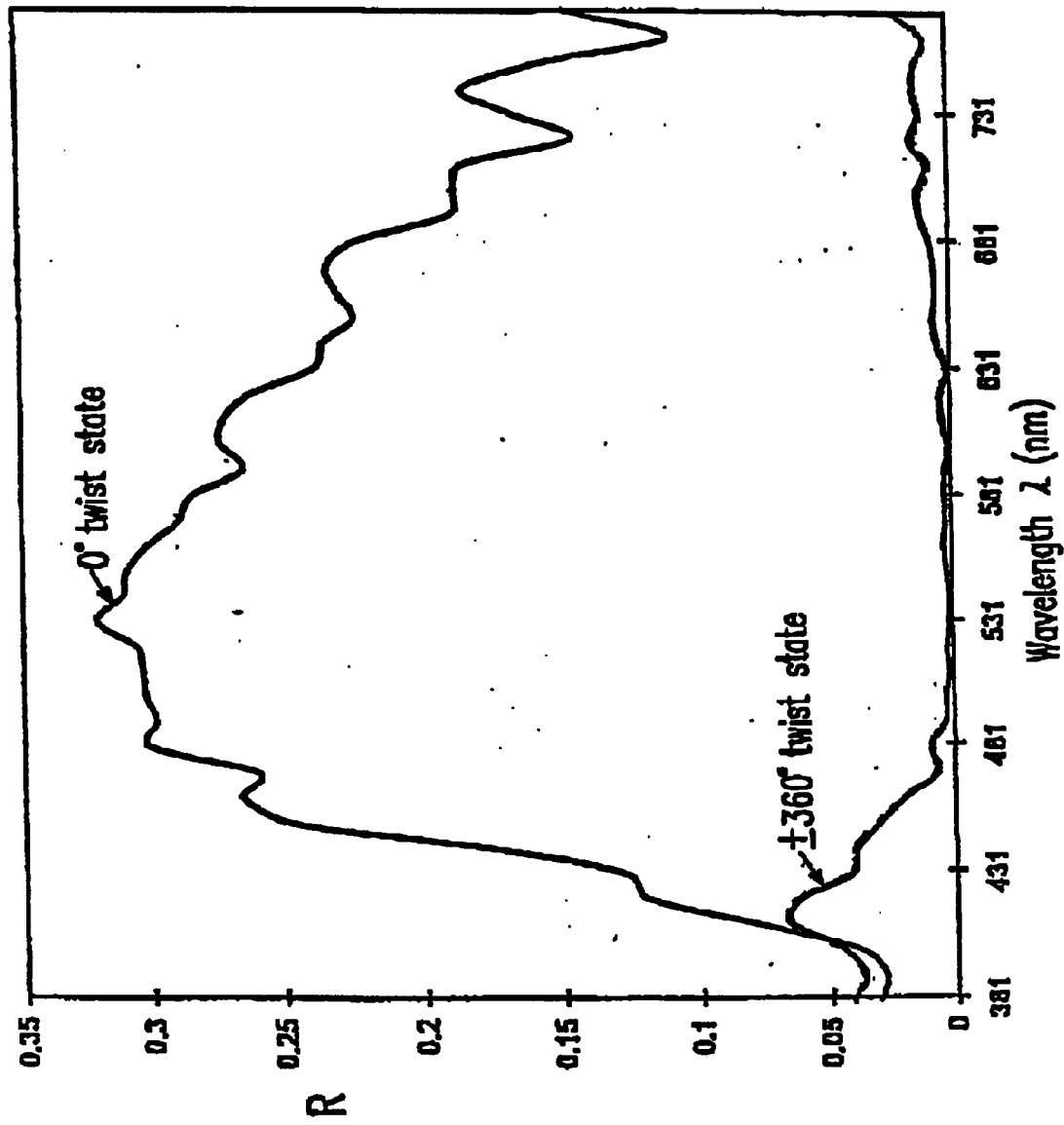
FIG. 39 shows a luminous reflectance versus wavelength plot for configuration shown in FIG. 38. High twist state provides the dark state.

The half-wave (Δn.d=270) retarder is at 15° to the transmission axis of the polariser and the quarter-wave (Δn.d=132.5) retarder and LC layer are both at 75°, as shown in FIG. 38. A 2 μm thick LC layer was used and this gave a contrast of 96 with a good dark state that is reasonably achromatic, except at low wavelengths. Luminous reflectance curves are shown in FIG. 39, it can be observed that the high twist (±360°) states gave very similar dark states.

Embodiment 11

Figure 40:
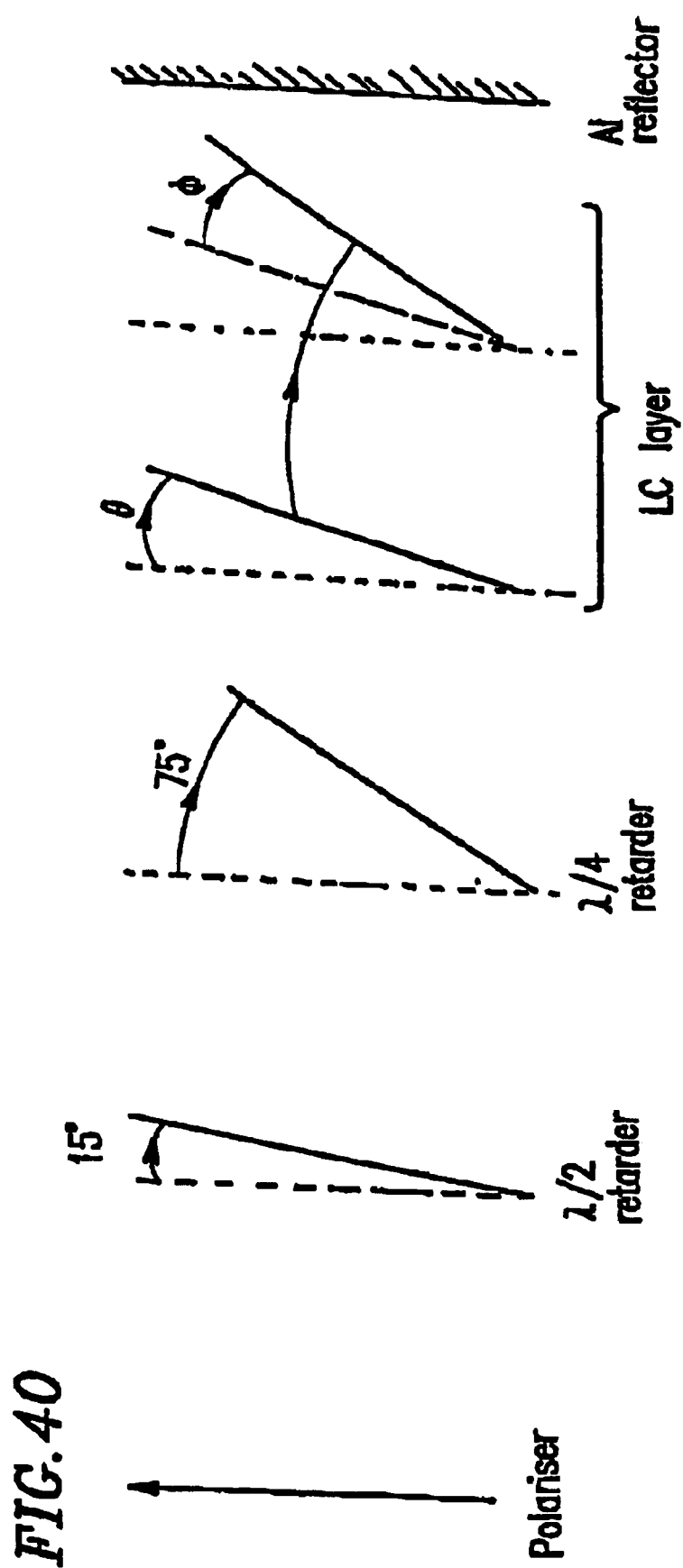
FIG. 40 shows a three-retarder achromatic configuration in reflection described in Embodiment 11; the LC orientation $\theta$ and twist $\phi$ are determined for different thickness LC layers. High twist state provided the dark state.
Figure 42:
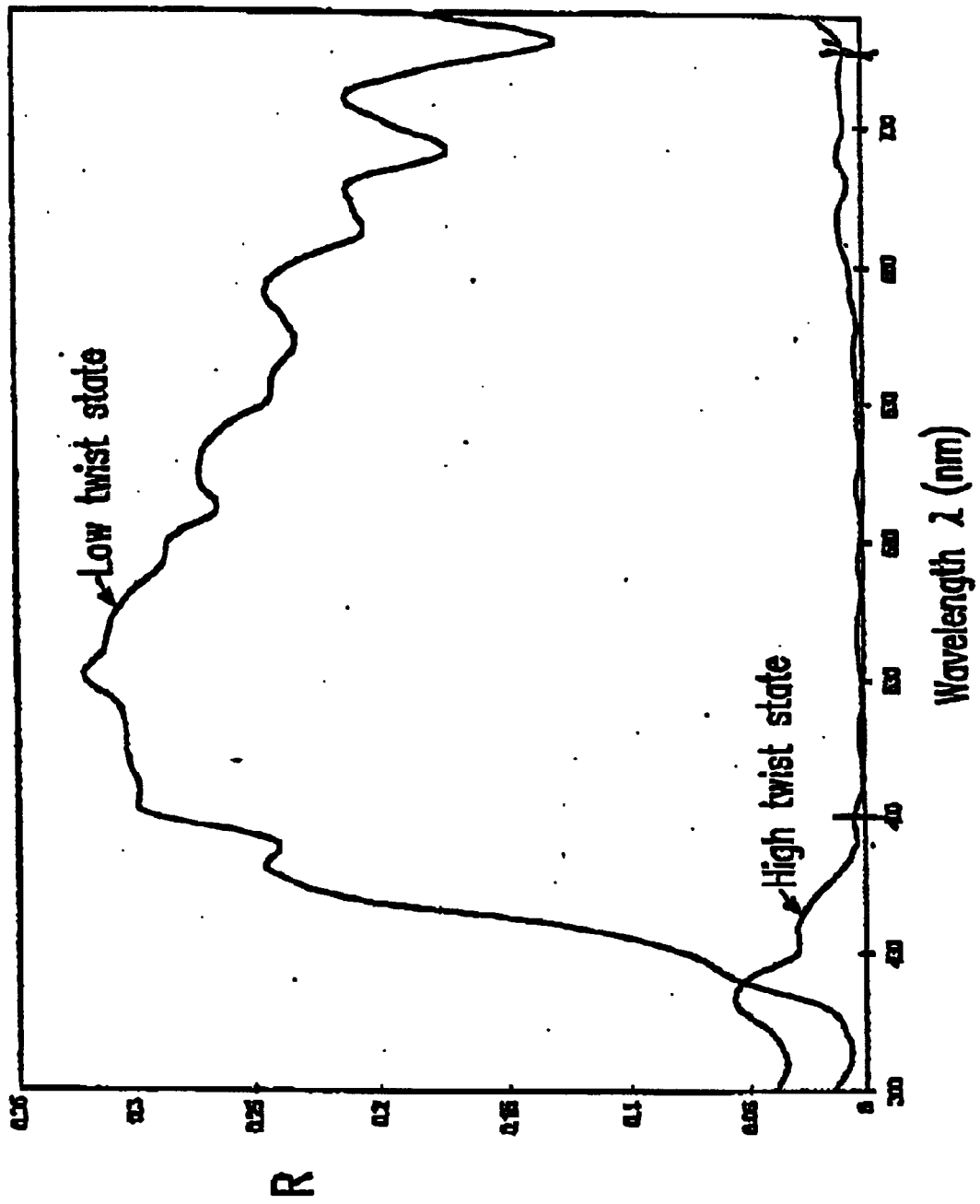
FIG. 42 is a luminous reflectance versus wavelength plot for $\Delta n.d/\lambda$=0.25.
Figure 43:
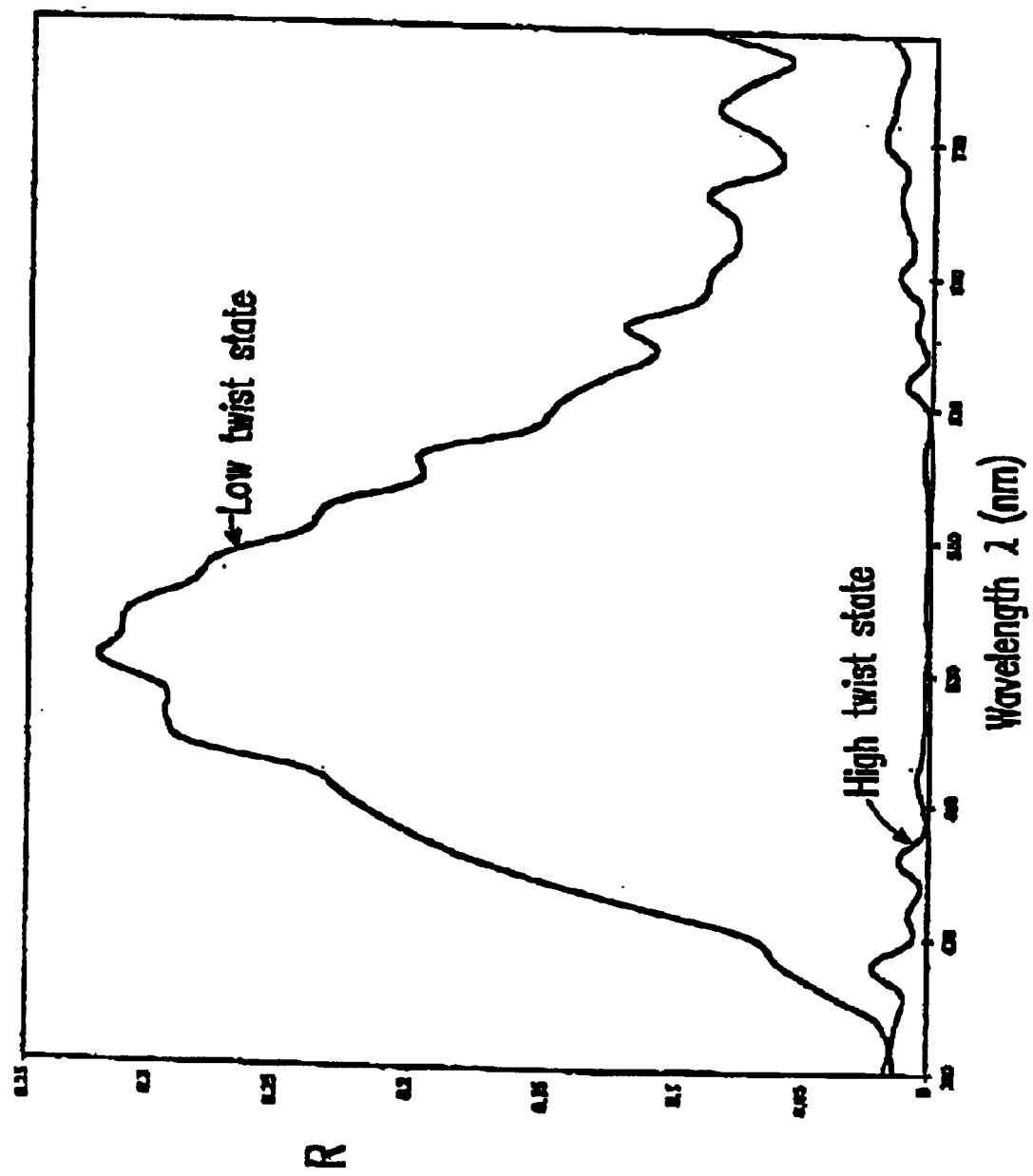
FIG. 43 is a luminous reflectance versus wavelength plot for $\Delta n.d/\lambda$=0.72.

Achromatic Configuration+LC (Varying the LC Layer Thickness)–High Twist Dark State This configuration utilises the same half-wave/quarter-wave retarder configuration used in Embodiment 10: the LC switches the achromatic quarter-wave configuration on and off. The LC configuration (θ and φ) which gave the best dark state for a given LC layer thickness was found. Repeating over a range of LC layer thickness' and therefore Δnd/λ as done in Embodiment 6. The bright state was given by the corresponding low twist state. The general configuration is represented in FIG. 40. The contrasts determined were plotted as a function of Δnd/λ in FIG. 41. Once again, two contrast maxima are found. The highest occurs at Δnd/λ= 0.25 (d=2 μm, θ=−70°, φ=−15°) and gives a contrast of 133. Its luminous reflectance curves are plotted in FIG. 42. As can be seen, a very good dark state (very achromatic) and a very reasonable bright state are obtained, though both are poor at low wavelengths. The second maxima occurs at Δnd/λ~0.72 (d=5.781 μm, θ=3°, φ=−24°), contrast of 106. The dark state is reasonably good but the bright state is very chromatic, see its' reflectance curves in FIG. 43.

Figure 44:
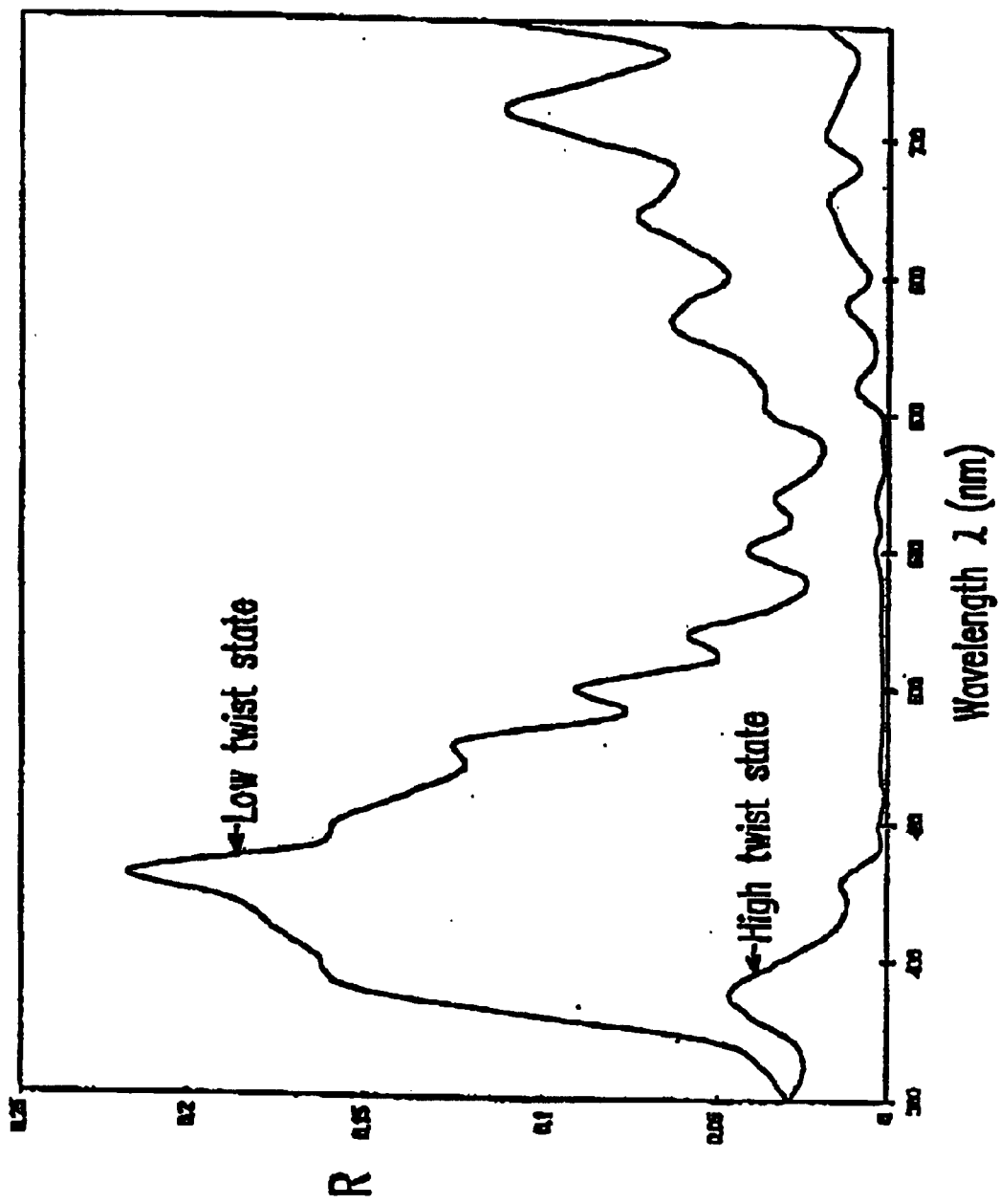
FIG. 44 is a luminous reflectance versus wavelength plot for $\Delta n.d/\lambda$=0.536.

An example of one of the poorer contrasts (CR=23) obtained (thickness of 4.3 μm, θ=0°, φ=−15°) is also included. Its reflectance curves, FIG. 44, show a reasonable dark state with a very poor bright state.

INDUSTRIAL APPLICABILITY

According to the invention, high contrast is obtained in reflection in various BTN configurations by means of achromatic dark states (dark over a wide range of wavelengths, preferably covering all the visible range) which switch to good bright states.

What is claimed is:

1. A reflective liquid crystal device comprising in sequence a linear polariser, a retarder arrangement comprising two retarders, and a reflector, characterized in that, in at least one state of the device, a first of said retarders acts to rotate linearly polarised light of wavelength λ and a second of the retarders acts to convert linearly polarised light of wavelength yλ (where 0.7<y<1.3) to substantially circular polarised light, and at least one of the said first and second retarders comprises a Bistable Twisted Nematic (BTN) liquid crystal, wherein the BTN is switchable between a first state in which it substantially converts linearly polarised light to circularly polarised light and a second state in which it does not convert linearly polarised light to circularly polarised light.

2. A device according to claim 1, wherein the retarder adjacent to the polariser is a fixed retarder with an optic axis at an angle $\theta_1$ to either the transmission or absorption axis of the polariser, and the retarder adjacent to the reflector is a BTN which in the low twist state, φ, has the input director (LC director at cell surface adjacent to retarder) at an angle $\theta_2 = 2\theta_1 + \theta(\phi) + x$, wherein x<5°.

3. A device according to claim 2, wherein $\theta_1$ is substantially 15° and the low twist state is substantially φ=0°.

4. A device according to claim 2, wherein 5°<$\theta_1$<25° and the low twist state is substantially φ=63.6°.

5. A device according to claim 4, wherein $\theta_1$=6° and the low twist state is substantially φ=63.6°.

6. A device according to claim 2, wherein $\theta_1$=15° and the low twist state is substantially φ=63.6°.

7. A device according to claim 2, wherein 5°<90°−$\theta_1$<25° and the low twist state is substantially φ=63.6°.

8. A device according to claim 7, wherein $\theta_1$=84° and the low twist state is substantially φ=63.6°.

9. A device according to claim 2, wherein $\theta_1$ and $\theta_2$ are both substantially 15° and the low twist state is substantially φ=85°.

10. A device according to claim 1, wherein the retarder adjacent to the polariser is a BTN which in the low twist state has φ=0° and optic axis at an angle α to either the transmission or absorption axis of the polariser and the retarder adjacent the reflector is a fixed retarder with optic axis at an angle 2α+45°+x, wherein x<5°, preferably 0°.

11. A device according to claim 1 in which the BTN switches between a state φ and (φ±360°).

12. A device according to claim 1 in which the BTN switches between a state φ and (φ±180°).

13. A reflective liquid crystal device comprising in sequence a linear polariser, a retarder arrangement comprising two retarders, and a reflector, characterized in that, a first of said retarders provides a retardation of substantially mλ/2 and a second of the retarders provides a retardation of substantially $n\lambda/4$ where m is an integer and n is an odd integer, at least one of the said first and second retarders comprises a Bistable Twisted Nematic (BTN) liquid crystal, and the at least one of the said first and second retarders is switchable between a first state in which the retarder provides a retardation of substantially $m\lambda/2$ or $n\lambda/4$ and a second state in which the retardation is substantially zero.

14. A device according to claim 13, wherein the wavelength $\lambda$ is an operating wavelength of the reflective liquid crystal device and is in the range 400–700 nm.

15. A device according to claim 14, wherein the wavelength $\lambda$ is in the range 420–600 nm.

16. A device according to claim 15, wherein the wavelength $\lambda$ is in the range 440–550 nm.

17. A device according to claim 13, wherein the retarder comprising a BTN liquid crystal provides a retardation of $n\lambda/4$.

18. A device according to claim 13 in which the BTN switches between a state $\phi$ and $(\phi \pm 360°)$.

19. A device according to claim 13 in which the BTN switches between a state $\phi$ and $(\phi \pm 180°)$.

* * * * *